United States Patent
Nakamura

(10) Patent No.: US 11,831,008 B2
(45) Date of Patent: Nov. 28, 2023

(54) NON-AQUEOUS ELECTROLYTE SECONDARY BATTERY AND METHOD FOR MANUFACTURING NON-AQUEOUS ELECTROLYTE SECONDARY BATTERY

(71) Applicant: MURATA MANUFACTURING CO., LTD., Kyoto (JP)

(72) Inventor: Toshikazu Nakamura, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 499 days.

(21) Appl. No.: 16/688,669

(22) Filed: Nov. 19, 2019

(65) Prior Publication Data

US 2020/0091503 A1   Mar. 19, 2020

Related U.S. Application Data

(63) Continuation of application No. PCT/JP2018/019019, filed on May 17, 2018.

(30) Foreign Application Priority Data

May 25, 2017   (JP) .................................. 2017-103664

(51) Int. Cl.
*H01M 4/36* (2006.01)
*B60L 53/22* (2019.01)
(Continued)

(52) U.S. Cl.
CPC ............. *H01M 4/364* (2013.01); *B60L 50/64* (2019.02); *B60L 53/22* (2019.02);
(Continued)

(58) Field of Classification Search
CPC ............. H01M 4/0459; H01M 4/1393; H01M 4/1395; H01M 4/364; H01M 4/366;
(Continued)

(56) References Cited

U.S. PATENT DOCUMENTS

2006/0110660 A1   5/2006   Satou et al.
2013/0288113 A1   10/2013   Onagi et al.
(Continued)

FOREIGN PATENT DOCUMENTS

CN   105684197   6/2016
EP   2 922 120   9/2015
(Continued)

OTHER PUBLICATIONS

English Language Machine Translation of WO-2015163017-A1 retrieved from Espacenet (Year: 2015).*
(Continued)

*Primary Examiner* — Scott J. Chmielecki
(74) *Attorney, Agent, or Firm* — K&L Gates LLP

(57) ABSTRACT

A non-aqueous electrolyte secondary battery includes at least a negative electrode including a negative electrode mixture, a positive electrode, and an electrolytic solution including an electrolyte and a solvent. The negative electrode mixture includes a negative electrode active material powder, the negative electrode active material powder includes a carbon-based material and a silicon-based material, a mixing ratio of the carbon-based material to the silicon-based material (carbon-based material (mass %)/silicon-based material (mass %)) is 90 mass %/10 mass % to 0 mass %/100 mass %.

12 Claims, 16 Drawing Sheets

(51) Int. Cl.
  *B60L 50/64* (2019.01)
  *H01M 4/04* (2006.01)
  *H01M 4/38* (2006.01)
  *H01M 4/587* (2010.01)
  *H01M 4/62* (2006.01)
  *H01M 10/0525* (2010.01)
  *H01M 10/0568* (2010.01)
  *H01M 50/124* (2021.01)
  *H01M 50/119* (2021.01)
  *H01M 4/02* (2006.01)

(52) U.S. Cl.
  CPC ......... *H01M 4/0459* (2013.01); *H01M 4/386* (2013.01); *H01M 4/587* (2013.01); *H01M 4/623* (2013.01); *H01M 10/0525* (2013.01); *H01M 10/0568* (2013.01); *H01M 50/119* (2021.01); *H01M 50/124* (2021.01); *H01M 50/1245* (2021.01); *H01M 2004/027* (2013.01); *H01M 2300/0025* (2013.01)

(58) Field of Classification Search
  CPC ...... H01M 4/386; H01M 4/587; H01M 4/623; H01M 10/0525; H01M 10/0568; H01M 50/119; H01M 50/124; H01M 2004/027; H01M 2300/0025
  See application file for complete search history.

(56) References Cited

U.S. PATENT DOCUMENTS

| | | |
|---|---|---|
| 2015/0030932 A1 | 1/2015 | Yoshida et al. |
| 2015/0372306 A1 | 12/2015 | Muraoka et al. |
| 2016/0099465 A1 | 4/2016 | Tsuchiya et al. |
| 2016/0126543 A1* | 5/2016 | Ota ............... H01M 4/1393 429/231.95 |
| 2016/0315310 A1* | 10/2016 | Kamo ............ H01M 4/131 |
| 2017/0187068 A1* | 6/2017 | Morisawa ...... H01M 4/626 |
| 2017/0288211 A1* | 10/2017 | Zhamu ........... H01M 4/386 |
| 2018/0241076 A1* | 8/2018 | Nishiura ........ H01M 4/48 |

FOREIGN PATENT DOCUMENTS

| | | |
|---|---|---|
| JP | H05144473 A | 6/1993 |
| JP | H07307164 A | 11/1995 |
| JP | H07335201 A | 12/1995 |
| JP | 2006156330 A | 6/2006 |
| JP | 2009-076372 | 4/2009 |
| JP | 2009076373 A | 4/2009 |
| JP | 2012038686 A | 2/2012 |
| JP | 2012074189 A | 4/2012 |
| JP | 2013145712 A | 7/2013 |
| JP | 2013243127 A | 12/2013 |
| JP | 2014235884 A | 12/2014 |
| JP | 2016076477 A | 5/2016 |
| WO | 2013/0999267 | 7/2013 |
| WO | 2014132579 A1 | 9/2014 |
| WO | WO-2015163017 A1 * | 10/2015 ...... B25F 5/00 |
| WO | 2016/157743 | 10/2016 |

OTHER PUBLICATIONS

International Search Report for Application No. PCT/JP2018/019019, dated Aug. 28, 2018.

Extended European Search Report dated Dec. 10, 2020 in corresponding European Application No. 18806210.3.

European Office Action dated Dec. 6, 2022 in corresponding European Application No. 18 806 210.3.

Chinese Office Action dated Apr. 24, 2022 in corresponding Chinese Application No. 201880034287.6.

* cited by examiner

EXTERNAL POWER SOURCE

NON-AQUEOUS ELECTROLYTE SECONDARY BATTERY AND METHOD FOR MANUFACTURING NON-AQUEOUS ELECTROLYTE SECONDARY BATTERY

CROSS REFERENCE TO RELATED APPLICATIONS

The present application is a continuation of PCT patent application no. PCT/JP2018/019019, filed on May 17, 2018, which claims priority to Japanese patent application no. JP2017-103664 filed on May 25, 2017, the entire contents of which are being incorporated herein by reference.

BACKGROUND

The present technology generally relates to a non-aqueous electrolyte secondary battery and a method for manufacturing a non-aqueous electrolyte secondary battery, and more specifically, to a non-aqueous electrolyte secondary battery, a method for manufacturing a non-aqueous electrolyte secondary battery, a battery pack, a vehicle, a power storage system, an electric tool, and an electronic device.

In recent years, the demand for batteries, particularly non-aqueous electrolyte secondary batteries has been rapidly expanded in technical fields such as personal computers (PCs), electronic devices such as portable communication terminals, vehicles such as electric vehicles, and new energy systems such as wind power generation.

SUMMARY

The present technology generally relates to a non-aqueous electrolyte secondary battery and a method for manufacturing a non-aqueous electrolyte secondary battery, and more specifically, to a non-aqueous electrolyte secondary battery, a method for manufacturing a non-aqueous electrolyte secondary battery, a battery pack, a vehicle, a power storage system, an electric tool, and an electronic device.

There is a concern that further improvement of battery characteristics and reliability are not achieved in the conventional non-aqueous electrolyte secondary battery. Therefore, a non-aqueous electrolyte secondary battery with further improved battery characteristics and reliability is required.

Therefore, the present technology has been made in view of such a situation, and a main object of the present technology is to provide a non-aqueous electrolyte secondary battery with excellent battery characteristics and excellent reliability, and a method for manufacturing the non-aqueous electrolyte secondary battery. Another main object of the present technology is to provide a battery pack, a vehicle, a power storage system, an electric tool, and an electronic device including a non-aqueous electrolyte secondary battery with excellent battery characteristics and excellent reliability.

As a result of intensive studies to solve the above-mentioned object, the present inventor has succeeded in developing a non-aqueous electrolyte secondary battery with excellent battery characteristics and excellent reliability, and a method for manufacturing the non-aqueous electrolyte secondary battery, and has completed the present technology.

According to an embodiment of the present disclosure, a non-aqueous electrolyte secondary battery is provided. The non-aqueous electrolyte secondary battery includes at least a negative electrode including a negative electrode mixture, a positive electrode, and an electrolytic solution including an electrolyte and a solvent. The negative electrode mixture includes a negative electrode active material powder, the negative electrode active material powder includes a carbon-based material and a silicon-based material, a mixing ratio of the carbon-based material to the silicon-based material (carbon-based material (mass %)/silicon-based material (mass %)) is from 90 mass %/10 mass % to 0 mass %/100 mass %, a negative electrode potential at a point of a battery voltage of 0 V is 3.2 Vvs ($Li/Li^+$) or less in a deep discharging at a current rate of 0.001 ItA reaching the battery voltage of 0 V, and an electrolyte concentration in the negative electrode mixture is higher than an electrolyte concentration in the electrolytic solution present in the non-aqueous electrolyte secondary battery excluding the negative electrode mixture.

In the non-aqueous electrolyte secondary battery according to the present technology, the negative electrode potential at the point of the battery voltage of 0 V may be 3.15 Vvs($Li/Li^+$) or less in the deep discharging at the current rate of 0.001 ItA reaching the battery voltage of 0 V.

The non-aqueous electrolyte secondary battery according to the present technology may further include a battery can including an iron-containing base material. The iron-containing base material may be nickel-plated. In the non-aqueous electrolyte secondary battery according to the present technology, an elliptical or plateau-like peak may not occur in a region in which the battery voltage is 0.5 V to 0 V in a discharge curve obtained in the deep discharging at the current rate of 0.001 ItA reaching the battery voltage of 0 V.

In the non-aqueous electrolyte secondary battery according to the present technology, the silicon-based material may include at least one compound selected from a group consisting of metallic silicon, silicon oxide, silicon fluoride, silicon alloy, lithium fluosilicate, and combinations thereof.

In the non-aqueous electrolyte secondary battery according to the present technology, the negative electrode active material powder may include at least one of fibrous carbon and high-conductivity powdery carbon.

In the non-aqueous electrolyte secondary battery according to the present technology, the electrolyte may contain at least lithium hexafluorophosphate.

In the non-aqueous electrolyte secondary battery according to the present technology, the electrolyte may contain at least a lithium electrolyte salt including boron.

In the non-aqueous electrolyte secondary battery according to the present technology, the negative electrode mixture may include at least polyvinylidene fluoride.

In the non-aqueous electrolyte secondary battery according to the present technology, a ratio of the electrolyte concentration in the negative electrode mixture to the electrolyte concentration in the electrolytic solution present in the non-aqueous electrolyte secondary battery excluding the negative electrode mixture ("electrolyte concentration in negative electrode mixture"/"electrolyte concentration in electrolytic solution present in non-aqueous electrolyte secondary battery excluding negative electrode mixture") may be more than 1 and 2.5 or less.

In the present technology, there is provided a method for manufacturing a non-aqueous electrolyte secondary battery including at least a negative electrode for a non-aqueous electrolyte secondary battery including a negative electrode active material powder, a positive electrode for a non-aqueous electrolyte secondary battery, and an electrolyte. The method includes a method for manufacturing the negative electrode for a non-aqueous electrolyte secondary battery which includes pre-doping lithium ions to the negative electrode active material powder through electrochemical treatment in an electrolyte-containing liquid and mixing at least the pre-doped negative electrode active material powder with a binder, and assembling the non-aqueous electrolyte secondary battery by using the negative electrode for a non-aqueous electrolyte secondary battery, the positive electrode for a non-aqueous electrolyte secondary battery, and the electrolyte.

In the method for manufacturing a non-aqueous electrolyte secondary battery according to the present technology, the method for manufacturing the negative electrode for a non-aqueous electrolyte secondary battery further may include obtaining a negative electrode paint produced by at least the pre-doped negative electrode active material powder and the binder by using a non-aqueous solvent, and obtaining an electrode plate by coating a current collector with the negative electrode paint, and drying and press-molding the current collector.

According to an embodiment of the present disclosure, a battery pack is provided. The battery pack includes the non-aqueous electrolyte secondary battery according to an embodiment of the present technology, a controller configured to control a use state of the non-aqueous electrolyte secondary battery, and a switch configured to switch the use state of the non-aqueous electrolyte secondary battery according to an instruction of the controller.

According to an embodiment of the present disclosure, a vehicle is provided. The vehicle includes the non-aqueous electrolyte secondary battery according to an embodiment of the present technology, a driving force converter configured to receive power supplied from the non-aqueous electrolyte secondary battery, and convert the received power into a driving force of the vehicle, a driver configured to drive according to the driving force, and a vehicle control device.

According to an embodiment of the present disclosure, a power storage system is provided. The power storage system includes a power storage device including the non-aqueous electrolyte secondary battery according to an embodiment of the present technology, a power consumption apparatus to which power is configured to be supplied from the non-aqueous electrolyte secondary battery, a controller configured to control the supply of the power to the power consumption apparatus from the non-aqueous electrolyte secondary battery, and a power generator configured to charge the non-aqueous electrolyte secondary battery.

According to an embodiment of the present disclosure, an electric tool is provided. The electric tool includes the non-aqueous electrolyte secondary battery according to an embodiment of the present technology, and a movable unit to which power from the non-aqueous electrolyte secondary battery is configured to be supplied.

According to an embodiment of the present disclosure, an electronic device is provided. The electronic device includes the non-aqueous electrolyte secondary battery according to an embodiment of the present technology. The electronic device is configured to receive power supplied from the non-aqueous electrolyte secondary battery.

According to the present technology, it is possible to improve battery characteristics and reliability. The effects described herein are not necessarily limited, and may be any of the effects described in the present disclosure or effects different from these effects.

DETAILED DESCRIPTION

Figures 1A, 1B:
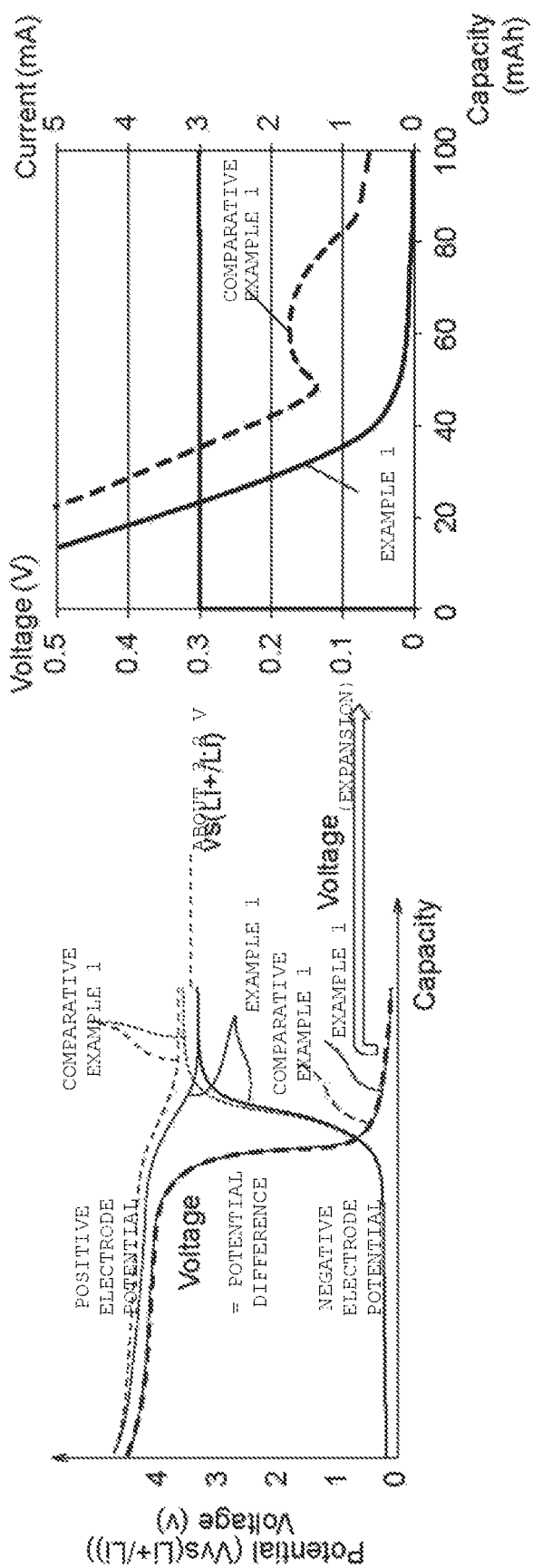
FIGS. 1A and 1B are diagrams illustrating a result of discharging in Example 1 and Comparative Example 1 according to an embodiment of the present technology.

As described herein, the present disclosure will be described based on examples with reference to the drawings, but the present disclosure is not to be considered limited to the examples, and various numerical values and materials in the examples are considered by way of example.

First, an overview of the present technology will be described.

As an active material used in a non-aqueous electrolyte secondary battery having an active material capable of occluding or releasing lithium ions, when a negative electrode is formed by adding a silicon-based material to a carbon-based material to form a negative electrode, as a ratio of the silicon-based material increases, there are two problems to be described below.

The first problem is degradation (capacity reduction), can tearing, or battery swelling due to deterioration in electric current collection performance. As the ratio of the silicon-based material increases, a mixture layer is further expanded due to charging, and thus, degradation (capacity reduction) caused by passage of charge and discharge cycles, such as deterioration in electric current collection performance due to electrical isolation of the silicon-based material in the mixture layer caused by expansion and contraction attendant upon charging and discharging or peeling of the mixture layer from a current collection foil is caused.

Both a cylindrical battery and a laminate battery deteriorate due to the deterioration in electric current collection performance. However, there is the problem of the can tearing in the cylindrical battery, and there is the problem of the battery swelling in the laminate battery.

The second problem is degradation (capacity reduction) due to generation of irreversible capacity after charging. Since the irreversible capacity of the silicon-based material due to charging and discharging is larger than that of the active material of the carbon-based material and does not completely converge even after the passage of the cycle, the irreversible capacity causes the capacity reduction caused by the charge and discharge cycles.

In order to solve the first problem, there is a method of increasing adhesion strength between mixture layers and current collection foils by using a polyimide-amide resin binder with high binding strength and improving the adhesive strength of the binder due to thermal hardening modification of through heat treatment of a negative electrode plate in water-based CMC-SBR electrodes.

In order to solve the second problem, there is a method of pre-occluding (pre-doping) Li ions by attaching Li metal to the negative electrode plate before the assembly of the battery in order to compensate an irreversible capacity loss in the negative electrode before the battery is manufactured.

As a first technology, a battery in which adhesion strength is strengthened with the polyimide-amide binder and the lithium ions pre-doped to a negative electrode active material SiOx after the negative electrode or the battery is produced. The pre-doping method at this time is the utilization of an internal battery reaction caused by attaching the Li metal to the produced negative electrode plate. As a second technology, a lithium secondary battery in which 8% or more of lithium within the negative electrode active material in a discharge cut-off state is pre-doped in the negative electrode active material before charging and discharging is suggested. The pre-doping method at this time is the utilization of an internal battery reaction caused by attaching the Li metal to the produced negative electrode plate.

In both the above-described technologies, after forming the negative electrode plate by paint production, coating, and press-molding by using the negative electrode active material in an uncharged state, a pre-doping process of the lithium ions is performed by attaching metallic lithium to the negative electrode plate before the assembly of the battery is performed after an electrolytic solution is injected to the battery. That is, since a natural potential of the negative electrode active material is a noble electropositive potential which is much higher than an oxidation-reduction potential of the metallic lithium, a method of dissolving the metallic lithium immediately after the electrolyte is injected, transferring electrons to a current collector (In the present disclosure, the current collector may be replaced with a current collection foil core or the current collection foil. The current collection foil core may be replaced with the current collector or the current collection foil, or the current collection foil may be replaced with the current collector or the current collection foil core), and occluding the lithium ions dissolved in the liquid in the negative electrode active material by using the electrons, that is, a method of pre-doping the lithium ions by using the internal battery reaction is suggested. However, since the negative electrode plate obtained by press-molding a mixture layer made of the negative electrode active material in the uncharged and unexpanded states is used, an effect of sufficiently improving problems such as deterioration in current collection performance due to peeling of the mixture layer from the current collection foil core caused the expansion and contraction of the negative electrode active material attendant upon charging and discharging and deterioration in cycle characteristics is not demonstrated. In particular, in a system having a high Si-containing negative electrode active material content, the above-described problem is more remarkable.

In the pre-doping of the lithium ions to the negative electrode described above, it is not useful for the passage of long-term cycles such as 500 cycles, and the effect of improving the degradation caused by the deterioration in current collection performance due to stress caused by a change in thickness of the negative electrode caused by the expansion and contraction of the active material attendant upon charging and discharging described above is insufficient.

There is a technology for pre-doping the Li ions into a carbon powder by merely mixing the metallic lithium having the oxidation-reduction potential at a potential which is less than a natural potential of carbon with the carbon and kneading with a specific solvent which does not contain an electrolyte such as $LiPF_6$. Preferably, granular metallic lithium having a small surface area is used, but when actually confirmed, a clear lithium ion pre-doping effect is not achieved.

The natural potential of the carbon itself is about 3.6 V vs. Li, and even though the carbon comes into contact with the metallic lithium, sufficient electronic conduction needs to be transmitted to each active material in order to satisfy the following formula (A).

$$6C + xLi + nxe^- \rightarrow C_6Li_x \qquad (A)$$

When the metallic lithium is attached to the negative electrode plate rolled on the current collection foil, since electrons generated by the following formula (B) are transferred to the next active material through a Cu foil, the reaction of (A) continuously occurs by using the electrons, and the Li ions are occluded, that is, pre-doped.

$$Li \rightarrow Li^+ + e^- \quad (B)$$

However, the effect cannot be actually confirmed in the above-described system of "kneading" in which individual active material grains move around in a separated state.

The present technology is based on the above-described situation, and according to the present technology, it is possible to improve and maintain battery characteristics and reliability of the non-aqueous electrolyte secondary battery. More specifically, according to the present technology, in the non-aqueous electrolyte secondary battery produced by using the negative electrode plate obtained by press-molding the negative electrode by using the active material powder expanded due to charging (pre-doping of Li ions), it is possible to decrease an adverse effect on current collection properties with the current collection foil caused by the expansion and contraction attendant upon charging and discharging even in a system in which the ratio of the silicon-based material is greatly improved within an active material composition (mixing ratio) of the carbon-based material and the silicon-based material, and it is possible to obtain the non-aqueous electrolyte secondary battery indicating a favorable charge and discharge cycle characteristics.

The non-aqueous electrolyte secondary battery according to the present technology is, for example, a cylindrical or square lithium ion secondary battery or a laminate film type lithium ion secondary battery, and is applied to a battery pack, a vehicle, a power storage system, an electric tool, and an electronic device.

The non-aqueous electrolyte secondary battery according to the first embodiment (an example of the non-aqueous electrolyte secondary battery) of the present technology is a non-aqueous electrolyte secondary battery that includes at least a negative electrode for a non-aqueous electrolyte secondary battery including a negative electrode mixture, a positive electrode for a non-aqueous electrolyte secondary battery, and an electrolytic solution including an electrolyte and a solvent. The negative electrode mixture includes a negative electrode active material powder, and the negative electrode active material powder includes a carbon-based material and a silicon-based material. A mixing ratio (carbon-based material (mass %)/silicon-based material (mass %)) of the carbon-based material to the silicon-based material is 90 mass %/10 mass % to 0 mass %/100 mass %. A negative electrode potential at a point of a battery voltage of 0 V is 3.2 Vvs (Li/Li$^+$) or less in deep discharging at a current rate of 0.001 ItA reaching the battery voltage of 0 V, and an electrolyte concentration in the negative electrode mixture is higher than an electrolyte concentration in the electrolytic solution present in the non-aqueous electrolyte secondary battery excluding the negative electrode mixture.

In accordance with the non-aqueous electrolyte secondary battery according to the first embodiment of the present technology, it is possible to improve and maintain battery characteristics and reliability of the non-aqueous electrolyte secondary battery. More specifically, it is possible to decrease an adverse effect on current collection properties with the current collection foil caused by the expansion and contraction attendant upon charging and discharging, and it is possible to obtain the non-aqueous electrolyte secondary battery indicating a favorable charge and discharge cycle characteristics.

In the non-aqueous electrolyte secondary battery according to the first embodiment of the present technology, it is preferable that the battery voltage of 0 V, the negative electrode potential at the battery voltage of 0 V is 3.15 Vvs (Li/Li$^+$) in the deep discharging at the current rate of 0.001 ItA reaching the battery voltage of 0 V. According to this preferable embodiment, the battery characteristics and reliability of the non-aqueous electrolyte secondary battery can be further improved and maintained.

In the non-aqueous electrolyte secondary battery according to the first embodiment of the present technology, the electrode mixture layer is formed by paint production, coating, and press-molding by using the negative electrode active material powder in which the expansion attendant upon charging in advance occurs by charging from 10% to 100%, preferably, from 30% to 100%, and is used for the negative electrode plate, and thus it is possible to minimize the change in thickness of the negative electrode plate even though the expansion and contraction of the active material occur due to charging and discharging. Accordingly, it is possible to obtain the negative electrode plate for the non-aqueous electrolyte including the carbon-based material and the silicon-based material or the non-aqueous electrolyte secondary battery including the same with excellent cycle characteristics by suppressing the deterioration in current collection performance due to the peeling of the mixture from the current collector caused by the expansion and contraction of the active material attendant upon the charging and discharging.

When the battery is assembled as the negative electrode plate in a charged state, the battery may be assembled by adjusting the positive electrode to be opposed in the charged state in advance by the same method as that of the negative electrode plate, for example, a method for charging the electrode in an electrolytic solution bath. The reason is that charge rates of the positive electrode and the negative electrode before the assembly are arbitrary, but when initial charging is performed as the battery after the assembly, since the lithium ions extracted from the positive electrode are occluded, that is, charged in the pre-doped negative electrode, the capacity of the negative electrode is greatly overcharged in some combinations of the charge rates before the assembly of the positive and negative electrodes, and capacity degradation is promoted.

Therefore, in the non-aqueous electrolyte secondary battery according to the first embodiment of the present technology, when the assembled battery is initially charged and is fully charged, it is possible to produce a battery which is not overcharged by performing adjustment such that a capacity (%) equivalent to the irreversible capacity at the time of initial charging in the negative electrode capacity is added to a full charge capacity at the time of initial charging of the battery.

For example, when the charge rate of the pre-doped negative electrode is 100% of the negative electrode capacity and the capacity equivalent to the irreversible capacity at the time of initial charging of the negative electrode is L %, the charging amount of the positive electrode is adjusted by charging the electrodes in advance such that the charge ratio of the positive electrode satisfies 100−L %, and the battery is assembled by using the electrodes. After the assembly, when the initial charging is performed by L % in order to achieve the full charging, the charge rate of the positive electrode is 100%, and the charge rate of the negative electrode is 100+L %. However, since the capacity equivalent to the irreversible capacity of the negative electrode is lost at the time of second full charging after the discharging, the charge rate of the positive electrode is 100% and the charge rate of the negative electrode is 100% at the time of second full charging, and thus, it is possible to produce a battery which does not become an overcharged battery.

The negative electrode plate is produced by paint production, coating on the current collection foil, and pressing by using the active material obtained by mixing the carbon-based material or the silicon-based material such as SiO with a predetermined composition, the binder, a predetermined conductive agent including fibrous carbon such as vapor growth carbon, and a predetermined painting solvent. Subsequently, the produced negative electrode plate is dried and is then punched at a predetermined size. Thereafter, an opposite electrode is produced as the positive electrode by using the positive electrode active material such as $LiCoO_2$, the binder, and the conductive agent by the same method as that of the negative electrode. Subsequently, the electrolytic solution is injected with a separator interposed between these electrodes, and a coin type cell is assembled. Thereafter, the charging capacity and the discharging capacity are measured by performing the initial and second charging and discharging under the following charging and discharging conditions.

Charging: current 0.1 ItA voltage 4.2 V CCCV charge cut-off current 0.001 ItA

Discharging: current 0.1 ItA CC discharge cut-off voltage 2.5 V

The obtained initial charging capacity is several percentages larger than the discharging capacity, and in the second charging and discharging, a difference between charging and discharging capacities is a small difference of less than 0.5%. In the initial charging, since the lithium ions equivalent to the irreversible capacity of the negative electrode active material are consumed, such a result is obtained.

Irreversible capacity L(%) at the time of initial charging of negative electrode={(initial charging capacity)−(initial discharging capacity)}/(initial charging capacity)×100(%)

Examples of the method for performing pre-doping charging for the negative electrode active material powder in advance and producing the negative electrode plate which is used in the non-aqueous electrolyte secondary battery according to the first embodiment of the present technology can include the following two methods.

Figure 2:
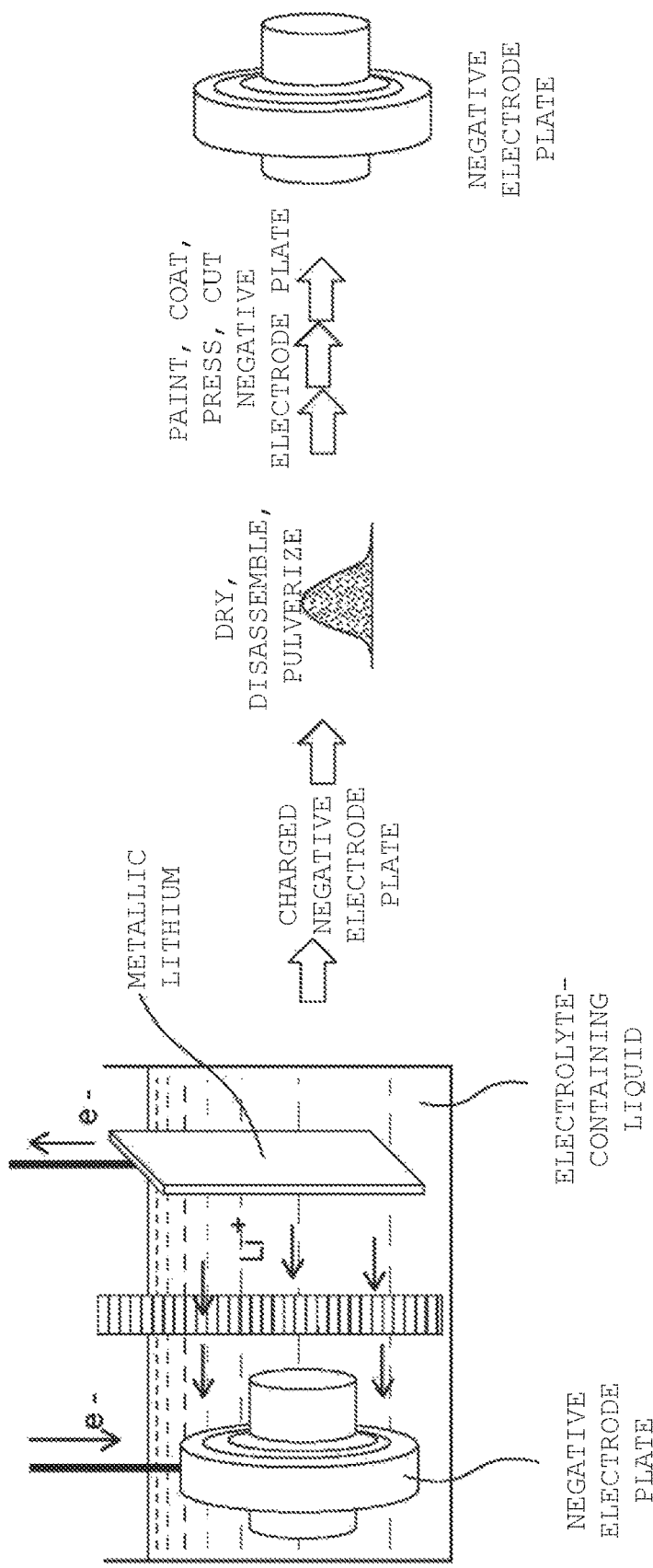
FIG. 2 is a diagram illustrating Means 1 for pre-doping lithium ions according to an embodiment of the present technology.

(Means 1) charging of negative electrode and pre-doping charging of lithium ions in liquid bath of electrolyte-containing liquid FIG. 2 is a diagram illustrating the pre-doping (Means 1) of the lithium ions. Means 1 will be described with reference to FIG. 2.

A wire such as a copper wire is attached to the coated and dried electrode winding hoop, and the wire attached to the electrode winding hoop is immersed in the electrolyte-containing liquid. Thereafter, the opposite electrode is manufactured by using the metallic lithium, and the metallic lithium is dissolved by a charging operation. Accordingly, the lithium ions are occluded in advance, that is, pre-doped in the negative electrode. Thereafter, the charged (expanded) active material powder in which the lithium ions are occluded, that is, pre-doped in advance is obtained by drying, stripping off the electrode mixture, and pulverizing. The electrode plate is obtained by paint production by using a non-aqueous solvent, coating on the current collection foil core, drying, and press-molding by using the charged powder, and thus, the negative electrode plate obtained by press-molding the mixture layer by using the charged and expanded active material powder is obtained.

Figure 3:
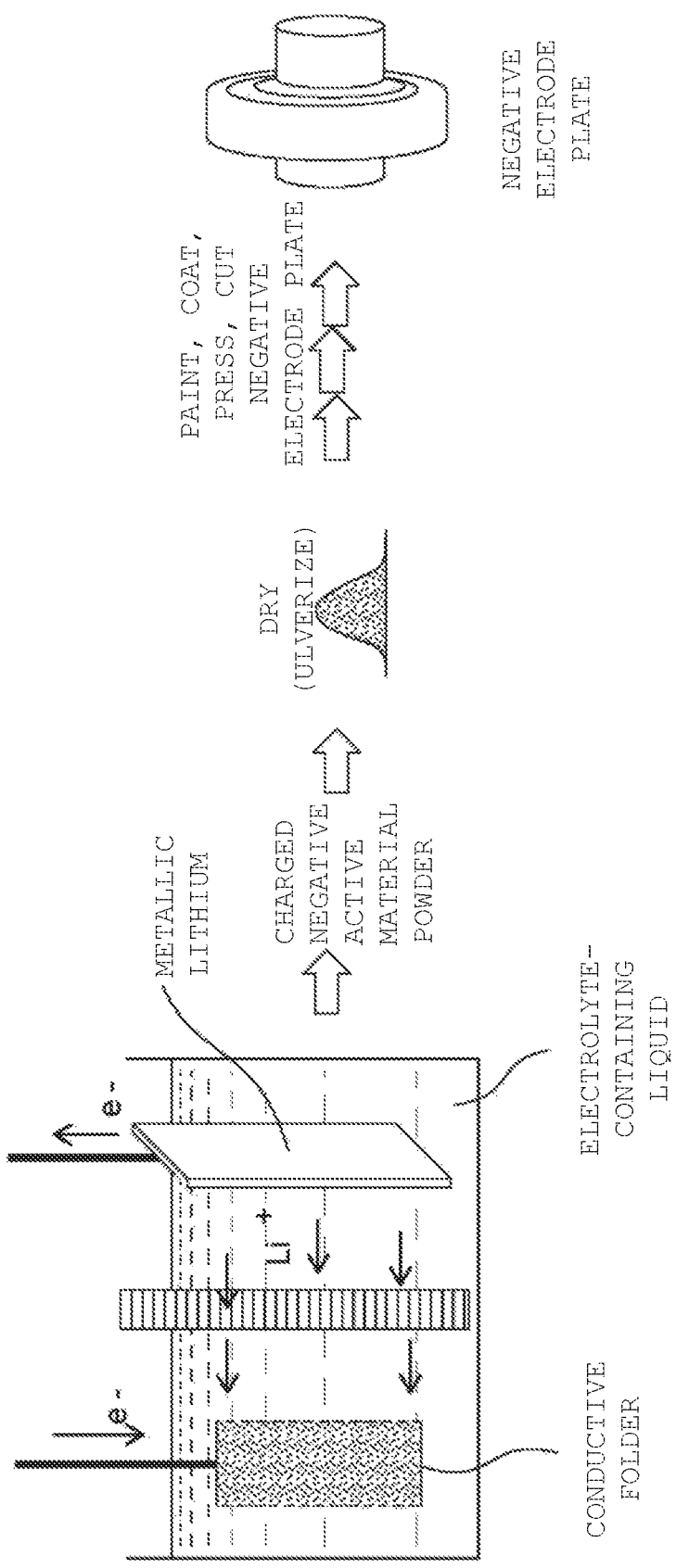
FIG. 3 is a diagram illustrating Means 2 for pre-doping lithium ions according to an embodiment of the present technology.

(Means 2) pre-doping charging of lithium ions to a negative electrode active material powder in liquid bath of electrolyte-containing liquid FIG. 3 is a diagram illustrating the pre-doping (Means 2) of the lithium ions. Means 2 will be described with reference to FIG. 3.

After the active material is sufficiently impregnated in a liquid in a liquid bath the electrolyte-containing liquid, the active material is brought into pressure contact with a conductive metal container (conductive folder) having a shape capable of transmitting the lithium ions, and the opposite electrode is manufactured by using the metallic lithium. Subsequently, the metallic lithium is dissolved by a charging operation, and a charged (expanded) active material powder in which the lithium ions are occluded in advance, that is, pre-doped, is obtained. The electrode plate is obtained by paint production by using a non-aqueous solvent, coating on the current collection foil core, drying, and press-molding by using the charged powder, and thus, the negative electrode plate obtained by press-molding the mixture layer by using the charged and expanded active material powder is obtained.

In producing any of the negative electrode plates (Means 1) and (Means 2), after the active material is immersed in the liquid bath of the electrolyte-containing liquid as a first step, charging in an electrode plate phase or a powder phase is performed. As a second step subsequent to the first step, after drying, the dried active material is formed once as a dried powder. Thereafter, the electrode plate is obtained by paint production by using an NMP solution of a PVDF binder, coating on the current collection foil, and pressing.

Therefore, in the case of the negative electrode plate of the non-aqueous electrolyte secondary battery according to the first embodiment of the present technology, in the state of the battery, the electrolyte concentration satisfies that a concentration "in the negative electrode mixture" >a concentration "in the electrolytic solution present in the battery excluding the negative electrode", and as a result of intensive examination, when a ratio of the concentration "in the negative electrode mixture"/the concentration "in the electrolytic solution present in the battery excluding the negative electrode" is more than 1 and 2.5 or less, it is possible to more preferably obtain a first non-aqueous electrolyte secondary battery according to the present technology with further improved charge and discharge cycle characteristics. When the ratio of the concentration "in the negative electrode mixture"/concentration "in the electrolytic solution present in the battery excluding the negative electrode" is more preferably 1.2 or more and 2.0 or less, it is possible to more preferably obtain the first non-aqueous electrolyte secondary battery according to the present technology with further improved charge and discharge cycle characteristics.

As for the electrolyte concentration in the negative electrode mixture, elements constituting the electrolyte present in the negative electrode mixture are analyzed and quantified by using ICP, and a void volume (mL or mL/g) in the negative electrode mixture layer is separately measured by using a mercury porosimeter. Accordingly, it is possible to calculate the electrolyte concentration (mol/L) included in the negative electrode mixture from the above-described two results.

As for the electrolyte concentration in the electrolytic solution present in the non-aqueous electrolyte secondary battery excluding the negative electrode mixture, the elements constituting the electrolyte in the electrolytic solution present in the non-aqueous electrolyte secondary battery excluding the negative electrode mixture are analyzed and quantified by using ICP, and thus, it is possible to calculate the electrolyte concentration (mol/L) included in the negative electrode mixture.

The electrolyte of the electrolyte-containing liquid (Means 1 and 2) and the electrolyte contained in the electrolytic solution injected at the time of assembling the battery may be the same, or may be different. The non-aqueous solvent of the electrolyte-containing liquid and the non-aqueous solvent contained in the electrolytic solution injected at the time of assembling the battery may be the same, or may be different.

For example, when the electrolyte contained in the electrolyte-containing liquid is $LiPF_6$, the electrolyte contained in the electrolytic solution may be at least one of $LiPF_6$, $LiBF_4$, LiBOB, and LiSI.

For example, when the non-aqueous solvent contained in the electrolyte-containing liquid is at least one of ethylene carbonate (EC), ethyl methyl carbonate (EMC), dimethyl carbonate (DMC), diethyl carbonate (DEC), methyl propionate (MP), ethyl propionate (PE), propyl propionate (PP), butyl propionate (PB), and propylene carbonate (PC), the non-aqueous solvent contained in the electrolyte may be at least one of ethylene carbonate (EC), ethyl methyl carbonate (EMC), dimethyl carbonate (DMC), diethyl carbonate (DEC), methyl propionate (MP), ethyl propionate (PE), propyl propionate (PP), butyl propionate (PB), and propylene carbonate (PC).

The non-aqueous solvent contained in the electrolyte-containing liquid and the non-aqueous solvent contained in the electrolytic solution may contain additives. When both the non-aqueous solvent included in the electrolyte-containing liquid and the non-aqueous solvent included in the electrolytic solution include the additives, the same kind of additives may be included, or different kinds of additives may be included. Examples of the additive include vinylene carbonate (VC), 4-fluoroethyl carbonate (FEC), ethylene sulfide (ES), propanesultone (PS), butanesultone (BS), and cyclohexynylbenzene (CHB).

After forming the negative electrode plate by paint production, coating, and press-molding by using the negative electrode active material in the uncharged state described above, a method for performing the process of pre-doping the lithium ion after the electrolytic solution is injected into the battery by attaching the metallic lithium to the negative electrode plate before the assembly of the battery is referred to as (Means 3).

In a dual carbon capacitor, there is a technology in which $LiPF_6$ is mixed in the separator, or the positive electrode, the negative electrode, and the separator in advance. When cations and anions of $LiPF_6$ are separated and $PF_6^-$ is occluded to the positive electrode and $Li^+$ is occluded to the negative electrode, it is possible to improve the cycle characteristics by compensating for decrease in $Li^+$ or $PF_6^-$ ion concentration caused at an electrode interface. However, the above-described technology relates to the effect of improving various problems focusing on the formation of a negative electrode carbon film. The present technology is not a system that separates and occludes the anions and cations as illustrated in the above-described technology, but a system based on an occlusion and releasing reaction in the movement of $Li^+$ between the positive and negative electrodes, that is, a lithium ion secondary battery. The present technology has contents different from those in the above-described technology. The negative electrode active material (powder) in the present technology is not only a mixed active material of one kind of carbon-based material and SiO, but also a mixed active material of another carbon-based material and another silicon-based material.

The non-aqueous electrolyte secondary battery according to the first embodiment of the present technology includes a negative electrode for a non-aqueous electrolyte secondary battery including a negative electrode mixture. For example, the negative electrode for a non-aqueous electrolyte secondary battery may include the negative electrode mixture on one side or both sides of the current collector for a negative electrode. The current collector for a negative electrode may be made of, for example, one or two or more of conductive materials such as copper, nickel, and stainless steel in a foil shape.

The negative electrode mixture included in the negative electrode for a non-aqueous electrolyte secondary battery may include at least a powder of the negative electrode active material, and may further include a binder and a conductive agent.

In addition to containing the pre-doped lithium, the negative electrode mixture may contain at least the electrolyte, and may contain examples of the above-described electrolyte species.

The powder of the negative electrode active material includes the carbon-based material and the silicon-based material. Hereinafter, the carbon-based material and the silicon-based material will be described in detail.

Since a change of the carbon-based material in a crystal structure during the occlusion and releasing of Li is extremely small, it is possible to obtain a high-energy density and excellent cycle characteristics.

The carbon-based material can also function as a conductive agent for a negative electrode. Examples of the carbon-based material include graphitizable carbon, non-graphitizable carbon, and graphite. However, it is preferable that an interplanar spacing of a (002) plane in the non-graphitizable carbon is 0.37 nm or more and an interplanar spacing of the (002) plane in the graphite is 0.34 nm or less. More specifically, the carbon-based material includes pyrolytic carbons, cokes, glassy carbon fibers, organic polymer compound fired bodies, activated carbon, and carbon blacks. The cokes include pitch coke, needle coke, and petroleum coke. The organic polymer compound fired body is obtained by firing (carbonizing) a polymer compound such as a phenol resin and a furan resin at an appropriate temperature. The carbon-based material may be low crystalline carbon which is heat-treated at a temperature of about 1000° C. or less, or may be amorphous carbon. A shape of the carbon-based material may be any of a fibrous shape, a spherical shape, a granular shape, and a scale shape.

The silicon-based material may be any of a simple substance, an alloy, and a compound (silicon oxide, silicon fluoride, and lithium fluosilicate) of silicon (Si), may be two or more thereof, or may include at least a part of phases of one or more thereof. The simple substance is a simple substance in a general sense (may contain a small amount of impurities), and does not necessarily mean 100% purity.

For example, the alloy of Si includes, as constituent elements other than Si, any one or more of Sn, Ni, Cu, Fe, Co, Mn, Zn, In, Ag, Ti, Ge, Bi, Sb, and Cr. For example, the compound of Si includes, as the constituent elements other than Si, any one or more of C, O, and F. For example, the compound of Si may include, as the constituent elements other than Si, any one or more of the elements described for the alloy of Si.

For example, the alloy of the compound of Si include $SiB_4$, $SiB_6$, $Li_2SiF_6$, $Mg_2Si$, $Ni_2Si$, $TiSi_2$r $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiOv$ (0<v≤2), and LiSiO. In SiOv, v may be 0.2<v<1.4.

It is preferable that a mixing ratio (mass % ratio) of the carbon-based material and the silicon-based material is a mixing ratio of the carbon-based material to the silicon-based material (carbon-based material (mass %)/silicon-based material (mass %)), is 90 mass %/10 mass % to 0 mass %/100 mass %, and is preferably 90 mass %/10 mass % to 50 mass %/50 mass %. According to this preferable embodiment, it is possible to further improve and maintain the battery characteristics and reliability of the non-aqueous electrolyte secondary battery.

In addition to the carbon-based material and the silicon-based material, the negative electrode active material powder may further include, as constituent elements, a material including any one or two of metal elements and metalloid elements. This is because a high-energy density can be obtained. The metal-based material may be any of a simple substance, an alloy, and a compound, or may be two or more thereof, or may include at least a part of one or two or more phases thereof. In addition to the material including two or more metal elements, the alloy includes a material including one or more metal elements and one or more kinds of metalloid elements. The alloy may also include nonmetallic elements. The structure thereof includes a solid solution, a eutectic (eutectic mixture), an intermetallic compound, and a coexistence of two or more kinds thereof.

The above-described metal element and metalloid element are, for example, one or two or more of the metal elements and the metalloid elements capable of forming an alloy with Li.

Specifically, the metal element and metalloid element include, for example, Mg, B, Al, Ga, In, Ge, Sn, Pb, Bi, Cd, Ag, Zn, Hf, Zr, Y, Pd, and Pt.

The binder is not particularly limited, and includes, for example, any one or more of synthetic rubber and polymer material.

For example, the synthetic rubber includes styrene butadiene rubber, fluorine rubber, and ethylene propylene diene. For example, the polymer material includes polyvinylidene fluoride and polyimide, and preferably, polyvinylidene fluoride.

The paint production solvent for producing the negative electrode mixture may be any solvent as long as the application solvent is a solvent capable of forming a paste by kneading the negative electrode active material, the binder, and the conductive agent. However, since the pre-doped lithium is contained in the pre-doped negative electrode active material by the above-described (Means 1 and 2), there is a possibility that the negative electrode mixture reacts with water and is deactivated. Thus, the application solvent is preferably a non-aqueous solvent, and more preferably, N-methylpyrrolidone (NMP). In addition to NMP, for example, propylene carbonate (PC) and tetrahydrofuran (THF) are considered, but NMP is preferable in consideration of compatibility with a binder such as polyvinylidene fluoride (PVDF).

The non-aqueous electrolyte secondary battery according to the first embodiment of the present technology includes the electrolytic solution including the electrolyte and the solvent. The electrolytic solution may further include other materials such as the above-described additives.

For example, the electrolyte (electrolyte salt) included in the electrolytic solution includes any one or two or more of salts such as a lithium salt. However, the electrolyte may include, for example, a salt other than the lithium salt. The other salt is, for example, a light metal salt other than the lithium salt.

Examples of the lithium salt include lithium hexafluorophosphate ($LiPF_6$), lithium tetrafluoroborate ($LiBF_4$), lithium bisoxalate borate (LiBOB), lithium fluorooxalate borate (LiFOB), and lithium difluorooxalate borate (LiDFOB), lithium bis (fluorosulfonyl)imide (LiFSI), lithium hexafluoroarsenate ($LiAsF_6$), lithium tetraphenylborate (LiB$(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). This is because excellent battery capacity, cycle characteristics and storage characteristics can be obtained.

Among these, $LiPF_6$ or $LiBF_4$ is preferable, and $LiPF_6$ is more preferable. This is because a higher effect can be obtained since an internal resistance is reduced. However, the electrolyte is not limited to the series of materials described above, and may be other materials.

The content of the electrolyte is not particularly limited, but among them, is preferably 0.3 mol/kg to 3.0 mol/kg with respect to the solvent. This is because high ion conductivity is obtained.

The solvent contains one or more of non-aqueous solvents such as organic solvents. Examples of the non-aqueous solvent include a cyclic carbonate ester, a chain carbonate ester, a lactone, a chain carboxylate ester, and a nitrile. This is because excellent battery capacity, cycle characteristics and storage characteristics can be obtained. Examples of the cyclic carbonate ester include ethylene carbonate, propylene carbonate, and butylene carbonate, and examples of the chain carbonate ester include dimethyl carbonate, diethyl carbonate, ethyl methyl carbonate, and methyl propyl carbonate. Examples of the lactone include γ-butyrolactone and γ-valerolactone. Examples of the carboxylate ester include methyl acetate, ethyl acetate, methyl propionate, ethyl propionate, propyl propionate, methyl butyrate, methyl isobutyrate, methyl trimethyl acetate, and ethyl trimethyl acetate. Examples of the nitrile include acetonitrile, glutaronitrile, adiponitrile, methoxyacetonitrile, and 3-methoxypropionitrile.

Examples of the non-aqueous solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N, N'-dimethylimidazolidinone, nitromethane, nitroethane, sulfolane, trimethyl phosphate, and dimethyl sulfoxide. This is because the same advantage is obtained.

Among these, one or two or more of ethylene carbonate, propylene carbonate, dimethyl carbonate, diethyl carbonate, and ethyl methyl carbonate are preferable. This is because more excellent battery capacity, cycle characteristics and storage characteristics can be obtained.

In this case, a combination of a high-viscosity (high dielectric constant) solvent such as ethylene carbonate and propylene carbonate (for example, a relative permittivity ε>30) and a low-viscosity solvent such as dimethyl carbonate, ethyl methyl carbonate, and diethyl carbonate (for example, viscosity 1 mPa·s) is more preferred. This is because a dissociative nature of the electrolyte salt and mobility of the ions are improved.

In particular, the solvent may contain one or more of an unsaturated cyclic carbonate ester, a halogenated carbonate ester, sultone (cyclic sulfonate ester), and acid anhydride. This is because the chemical stability of the electrolytic solution is improved. The unsaturated cyclic carbonate ester is a cyclic carbonate ester having one or more unsaturated bonds (carbon-carbon double bonds) such as vinylene carbonate, vinyl ethylene carbonate, and methylene ethylene carbonate. The halogenated carbonate ester is a cyclic or chain carbonate ester including one or more halogens as a constituent element. Examples of the cyclic halogenated carbonate esters include 4-fluoro-1,3-dioxolan-2-one and 4,5-difluoro-1,3-dioxolan-2-one. Examples of the chain halogenated carbonate esters include fluoromethyl methyl carbonate, bis(fluoromethyl) carbonate, and difluoromethyl methyl carbonate. Examples of the sultone include propane sultone and propene sultone. Examples of the acid anhydride include succinic anhydride, ethanedisulfonic anhydride, and sulfobenzoic acid anhydride. However, the solvent is not limited to the series of materials described above, and other materials may be used.

The non-aqueous electrolyte secondary battery according to the first embodiment of the present technology includes a positive electrode for a non-aqueous electrolyte secondary battery.

The positive electrode for a non-aqueous electrolyte secondary battery may include the positive electrode active material on one side or both sides of the current collector for a positive electrode. The positive electrode for a non-aqueous electrolyte secondary battery may include any one or more of other materials such as a binder and a conductive agent. The current collector for a positive electrode is made of, for example, one or two or more of conductive materials such as aluminum, nickel, and stainless steel in a foil shape.

As the positive electrode active material, one or two or more of materials capable of occluding and releasing the lithium are included.

The positive electrode active material is preferably a lithium-containing compound, and more specifically, preferably one or both of a lithium-containing composite oxide and a lithium-containing phosphate compound. This is because a high-energy density can be obtained.

The "lithium-containing composite oxide" is oxide including the lithium and one or two or more elements (hereinafter, referred to as "other element", and here, the lithium (Li) is excluded), and has a layered rock salt type crystal structure or a spinel type crystal structure. The "lithium-containing phosphate compound" is a phosphate compound including the lithium and one or two or more other elements as constituent elements, and has an olivine type crystal structure.

The kind of the other element is not particularly limited as long as the element is any one or two or more of arbitrary elements. Among them, the other element is one or two or more of elements belonging to Groups 2 to 15 in a long-period periodic table. More specifically, the other element is more preferably one or two or more metal elements of nickel (Ni), cobalt (Co), manganese (Mn), and iron (Fe).

This is because a high voltage can be obtained.

Among them, it is preferable that the lithium-containing composite oxide having a layered rock salt type crystal structure is one or more of the compounds represented by each of Formulas (21) to (23).

$$Li_aMn_{(1-b-c)}Ni_bM11_cO_{(2-d)}F_e \qquad (21)$$

(M11 is at least one of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); a to e satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. However, the composition of lithium varies depending on the charged and discharged states, and a is a value of a completely discharged state.)

$$Li_aNi_{(1-b)}M12_bO_{(2-c)}F_d \qquad (22)$$

(M12 is at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); a to d satisfy $0.8 \leq a \leq 1.2$, $0.005 \leq b \leq 0.5$, $-0.1 \leq c \leq 0.2$, and $0 \leq d \leq 0.1$. However, the composition of lithium varies depending on the charged and discharged states, and a is a value of a completely discharged state.)

$$Li_aCo_{(1-b)}M13b O_{(2-c)}F_d \qquad (23)$$

(M13 is at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); a to d satisfy $0.8 \leq a \leq 1.2$, $0 \leq b < 0.5$, $-0.1 \leq c \leq 0.2$, and $0 \leq d \leq 0.1$. However, the composition of lithium varies depending on the charged and discharged states, and a is a value of a completely discharged state.)

Specific examples of the lithium-containing composite oxide having the layered rock salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

The lithium-containing composite oxide having the spinel crystal structure is preferably one or two or more of compounds represented by Formula (24).

$$Li_aMn_{(2-b)}M14_bO_cF_d \qquad (24)$$

(M14 is at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); a to d satisfy $0.9 \leq a \leq 1.1$, $0 \leq b \leq K\ 0.6$, $3.7 \leq c \leq 4.1$, and $0\ d\ 0.1$. However, the composition of lithium varies depending on the charged and discharged states, and a is a value of a completely discharged state.)

A specific example of the lithium-containing composite oxide having the spinel type crystal structure is $LiMn_2O_4$.

The lithium-containing phosphate compound having the olivine type crystal structure is one or two or more of compounds represented by Formula (25).

$$Li_aM15PO_4 \qquad (25)$$

(M15 is at least one of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. However, the composition of lithium varies depending on the charged and discharged states, and a is a value of a completely discharged state.)

Specific examples of the lithium-containing phosphate compound having the olivine type crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be any one or two or more of compounds represented by Formula (26).

$$(Li_2MnO_3)x(LiMnO_2)_{1-x} \qquad (26)$$

(x satisfies 0≤x≤1. However, the composition of the lithium varies depending on the charged and discharged states, and x is a value of a completely discharged state.)

The binder for a positive electrode includes, for example, one or two or more of a synthetic rubber and a polymer material. Examples of the synthetic rubber include a fluorine-based rubber and an ethylene propylene diene. Examples of the polymer material include polyvinylidene fluoride, polytetrafluoroethylene, a copolymer of vinylidene fluoride and hexafluoropyrene, polyacrylonitrile, and polyacrylic acid polymer polyimide.

The conductive agent for a positive electrode includes, for example, one or two or more of carbon materials. Examples of the carbon material include graphite, carbon black, acetylene black, and ketjen black. The conductive agent for a positive electrode may be a metal material or a conductive polymer as long as the material is a conductive material.

The material for a positive electrode may be any one or two or more of oxides, disulfides, chalcogenides, and conductive polymers. Examples of the oxide include titanium oxide, vanadium oxide, and manganese dioxide. Examples of the disulfide include titanium disulfide and molybdenum sulfide. The chalcogenide is, for example, niobium selenide. The conductive polymer is, for example, sulfur, polyaniline, and polythiophene. However, the positive electrode material is not limited to the series of materials described above, and may be other materials.

The non-aqueous electrolyte secondary battery according to the first embodiment of the present technology may include a separator. The separator allows the lithium ions to pass while preventing a short circuit due to contact between both the electrodes by separating the positive electrode for a non-aqueous electrolyte secondary battery and the negative electrode for a non-aqueous electrolyte secondary battery. The separator is, for example, a porous film such as a synthetic resin and ceramic, and may be a laminated film in which two or more of porous films are laminated. Examples of the synthetic resin include polytetrafluoroethylene, polypropylenem and polyethylene.

A method for manufacturing a non-aqueous electrolyte secondary battery according to a second embodiment (an example of a method for manufacturing a non-aqueous electrolyte secondary battery) of the present technology is a method for manufacturing a non-aqueous electrolyte secondary battery that includes at least a negative electrode for a non-aqueous electrolyte secondary battery including a negative electrode active material powder, a positive electrode for a non-aqueous electrolyte secondary battery, and an electrolytic solution. The method includes a method for manufacturing the negative electrode for a non-aqueous electrolyte secondary battery, and a method for assembling the non-aqueous electrolyte secondary battery by using the negative electrode for a non-aqueous electrolyte secondary battery, the positive electrode for a non-aqueous electrolyte secondary battery, and the electrolytic solution. The method for manufacturing the negative electrode for a non-aqueous electrolyte secondary battery includes pre-doping lithium ions to the negative electrode active material power through electrochemical treatment in an electrolyte-containing liquid, and mixing at least the pre-doped negative electrode active material powder and a binder.

In accordance with the non-aqueous electrolyte secondary battery obtained by the method for manufacturing the non-aqueous electrolyte secondary battery according to the second embodiment of the present technology, it is possible to improve and maintain battery characteristics and reliability of the non-aqueous electrolyte secondary battery. More specifically, it is possible to decrease an adverse effect on current collection properties with the current collection foil caused by the expansion and contraction attendant upon charging and discharging, and it is possible to obtain the non-aqueous electrolyte secondary battery indicating a favorable charge and discharge cycle characteristics.

Preferably, the method for manufacturing the negative electrode for a non-aqueous electrolyte secondary battery includes at least obtaining a negative electrode paint produced by the pre-doped negative electrode active material powder and the binder by using a non-aqueous solvent, and obtaining an electrode plate by coating a current collector with the negative electrode paint, and drying and press-molding (rolling) the current collector.

A specific example of pre-doping in the method for manufacturing the negative electrode for a non-aqueous electrolyte secondary battery and the method for producing the negative electrode plate, there are the above-described (Means 1) and (Means 2). The electrochemical treatment in the electrolyte-containing liquid for pre-doping means treatment using an electrochemical reaction.

The positive electrode for a non-aqueous electrolyte secondary battery can be manufactured by the same producing method as the method after the paint production in the manufacturing method of the negative electrode.

The assembling of the non-aqueous electrolyte secondary battery by using the negative electrode for a non-aqueous electrolyte secondary battery, the positive electrode for a non-aqueous electrolyte secondary battery, and the electrolytic solution is as follows in the case of the cylindrical lithium ion secondary battery.

Initially, a positive electrode lead is attached to the positive electrode current collector by using a welding method, and a negative electrode lead is attached to the negative electrode current collector by using a welding method. Subsequently, after a wound electrode body is produced by laminating and winding the positive electrode and the negative electrode with the separator interposed therebetween, a center pin is inserted into a winding center. Subsequently, the wound electrode body is accommodated in a battery can while being sandwiched between a pair of insulating plates. In this case, a tip of the positive electrode lead is attached to a safety valve mechanism by using a welding method, and a tip of the negative electrode lead is attached to the battery can by using a welding method. Subsequently, the electrolytic solution in which the electrolyte is dispersed in the non-aqueous solvent is injected into the battery can and is impregnated in the separator. Subsequently, a battery lid, the safety valve mechanism, and a heat sensitive resistance element are caulked to an opening end of the battery can through a gasket.

The application of the non-aqueous electrolyte secondary battery will be described in detail below.

The non-aqueous electrolyte secondary battery is applied, but is not particularly limited, to machines, equipment, instruments, devices, and systems (a current collector such as multiple pieces of equipment) capable of using the non-aqueous electrolyte secondary battery as a power source for driving or a power storage source for power storage. The non-aqueous electrolyte secondary battery used as the power source may be a main power source (a power source used preferentially) or an auxiliary power source (a power source used in place of or switched from the main power source). When the non-aqueous electrolyte secondary battery is used as the auxiliary power source, the type of the main power source is not limited to the non-aqueous electrolyte secondary battery.

For example, the application of the non-aqueous electrolyte secondary battery is as follows. The non-aqueous electrolyte secondary battery is applied to electronic devices (including portable electronic devices) such as laptop personal computers, tablet computers, mobile phones (for example, smart phones), personal digital assistants (PDA), imaging devices (for example, digital still cameras and digital video cameras), audio devices (for example, portable audio players), game devices, cordless phones, electronic books, electronic dictionaries, radios, headphones, navigation systems, memory cards, pacemakers, hearing aids, lighting devices, toys, medical devices, and robots. The non-aqueous electrolyte secondary battery is applied to portable living devices such as an electric shaver. The non-aqueous electrolyte secondary battery is applied to storage devices such as backup power sources and memory cards. The non-aqueous electrolyte secondary battery is applied to electric tools such as electric drills and electric saws. The non-aqueous electrolyte secondary battery is applied to a battery pack used for a laptop computer as a detachable power source. The non-aqueous electrolyte secondary battery is applied to medical electronic devices such as pacemakers and hearing aids. The non-aqueous electrolyte secondary battery is applied to vehicles used for an electric vehicle (including a hybrid vehicle). The non-aqueous electrolyte secondary battery is applied to power storage systems such as a household battery system that stores electric power in case of an emergency. Of course, other applications may be used.

Especially, the non-aqueous electrolyte secondary battery is usefully applied to the battery pack, the vehicle, the power storage system, the power tool, and the electronic device. Since the excellent battery characteristics are required, it is possible to effectively improve the performance by using the non-aqueous electrolyte secondary battery according to the present technology. The battery pack is the power source using the non-aqueous electrolyte secondary battery, and is a so-called assembled battery. The vehicle is a vehicle that operates (runs) using the non-aqueous electrolyte secondary battery as the power source for driving, and may be a vehicle (such as a hybrid vehicle) that includes a drive source other than the non-aqueous electrolyte secondary battery, as described above. The power storage system includes, for example, a residential power storage system, and is a system using the non-aqueous electrolyte secondary battery as the power storage source. In the power storage system, since power is stored in the non-aqueous electrolyte secondary battery which is an electric power storage source, an electric power consumption apparatus, for example, a household electric product can be used by using the power. The electric tool is a tool in which a movable unit (for example, a drill) moves by using the non-aqueous electrolyte secondary battery as the power source for driving. The electronic device is a device that exhibits various functions by using the non-aqueous electrolyte secondary battery as the power source (power supply source) for driving.

Here, some application examples of the non-aqueous electrolyte secondary battery will be specifically described. Since a configuration of each application example to be described below is merely an example, the configuration thereof can be appropriately changed.

A battery pack according to a third embodiment of the present technology includes the non-aqueous electrolyte secondary battery according to the first embodiment of the present technology, a control unit that controls a use state of the non-aqueous electrolyte secondary battery, and a switch unit that switches the use state of the non-aqueous electrolyte secondary battery according to an instruction of the control unit. Since the battery pack according to the third embodiment of the present technology includes the non-aqueous electrolyte secondary battery according to the first embodiment of the present technology having excellent battery characteristics and excellent reliability, the performance and reliability of the battery pack are improved.

Hereinafter, the battery pack according to the third embodiment of the present technology will be described with reference to the drawings.

Figure 6:
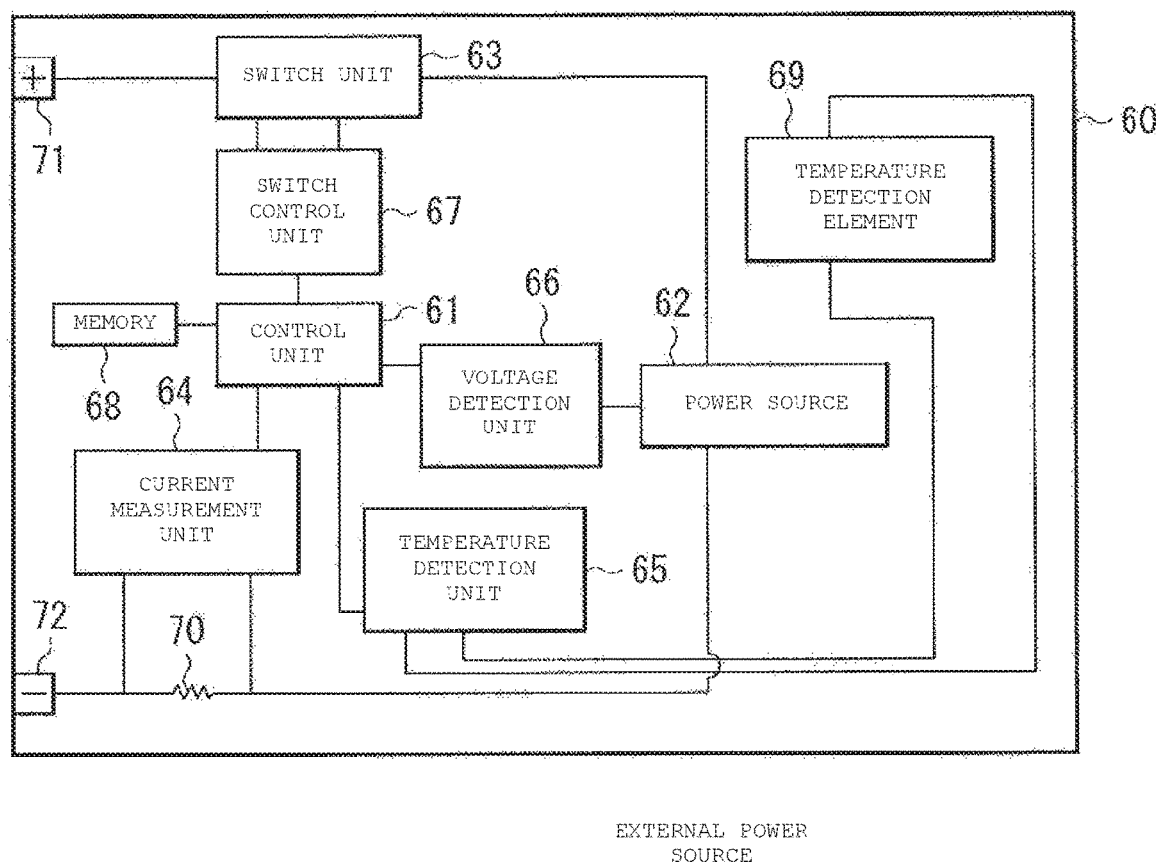
FIG. 6 is a block diagram illustrating a configuration of an application example of a non-aqueous electrolyte secondary battery according to an embodiment of the present technology.

FIG. 6 illustrates a block configuration of the battery pack. The battery pack includes, for example, a control unit 61 (controller), a power source 62, a switch unit 63, a current measurement unit 64, a temperature detection unit 65, and a voltage detection unit 66, a switch control unit 67, a memory 68, a temperature detection element 69, a current detection resistor 70, a positive electrode terminal 71, and a negative electrode terminal 72 within a housing 60 made of a plastic material.

The control unit 61 controls the entire operation (including the use state of the power source 62) of the battery pack, and includes, for example, a central processing unit (CPU). The power source 62 includes one or two or more non-aqueous electrolyte secondary batteries (not illustrated). The power source 62 is, for example, an assembled battery including two or more non-aqueous electrolyte secondary batteries, and a connection type of these non-aqueous electrolyte secondary batteries may be in series, may be in parallel, or may be a mixed type thereof. For example, the power source 62 includes six non-aqueous electrolyte secondary batteries connected in two parallel and three series.

The switch unit 63 switches the use state of the power source 62 (whether or not the power source 62 can be connected to an external device) according to the instruction from the control unit 61. The switch unit 63 includes, for example, a charging control switch, a discharging control switch, a charging diode, and a discharging diode (all not illustrated). The charging control switch and the discharging control switch are, for example, semiconductor switches such as a field effect transistor (MOSFET) using a metal oxide semiconductor.

The current measurement unit 64 measures a current by using the current detection resistor 70, and outputs a measurement result to the control unit 61. The temperature detection unit 65 measures a temperature by using the temperature detection element 69, and outputs a measurement result to the control unit 61. For example, this temperature measurement result is used when the control unit 61 performs charging and discharging control during abnormal heat generation or when the control unit 61 performs correction processing when the remaining capacity is calculated. The voltage detection unit 66 measures a voltage of the non-aqueous electrolyte secondary battery in the power source 62, converts an analog value of the measured voltage to a digital value, and supplies the converted voltage to the control unit 61.

The switch control unit 67 controls an operation of the switch unit 63 according to a signal input from the current measurement unit 64 and the voltage detection unit 66.

For example, when a battery voltage reaches an overcharge detection voltage, the switch control unit 67 disconnects the switch unit 63 (charging control switch), and controls a charging current not to flow through a current path of the power source 62. Accordingly, the power source 62 can only be discharged through the discharging diode. For example, the switch control unit 67 is configured to cut off the charging current when a large current flows during charging.

For example, when the battery voltage reaches an overdischarge detection voltage, the switch control unit 67 disconnects the switch unit 63 (discharging control switch), and controls the discharging current not to flow through the current path of the power source 62. Accordingly, the power source 62 can only be charged through the charging diode. For example, the switch control unit 67 is configured to cut off the discharging current when a large current flows during discharging.

For example, in the non-aqueous electrolyte secondary battery, the overcharge detection voltage is 4.2 V±0.05 V, and the overdischarge detection voltage is 2.4 V±0.1 V.

The memory 68 is, for example, an EEPROM which is a nonvolatile memory.

For example, the memory 68 stores numerical values calculated by the control unit 61, information (for example, internal resistance in the initial state) on the non-aqueous electrolyte secondary battery measured in a manufacturing process stage. When the full charge capacity of the non-aqueous electrolyte secondary battery is stored in the memory 68, the control unit 61 can ascertain information such as the remaining capacity.

The temperature detection element 69 is an element that measures the temperature of the power source 62 and outputs the measurement result to the control unit 61, and is, for example, a thermistor.

The positive electrode terminal 71 and the negative electrode terminal 72 are terminals that are connected to an external device (for example, a laptop personal computer) operated by using the battery pack or an external device (for example, a charger) used to charge the battery pack. The charging and discharging of the power source 62 are performed through the positive electrode terminal 71 and the negative electrode terminal 72.

A vehicle according to a fourth embodiment of the present technology includes the non-aqueous electrolyte secondary battery according to the first embodiment of the present technology, and a driving force conversion device (converter) that converts power supplied from the non-aqueous electrolyte secondary battery into a driving force, a drive unit (driver) that is driven according to the driving force, and a vehicle control device. Since the vehicle according to the fourth embodiment of the present technology includes the non-aqueous electrolyte secondary battery according to the first embodiment of the present technology having excellent battery characteristics and excellent reliability, the performance and reliability of the vehicle are improved.

Hereinafter, a vehicle according to a fourth embodiment of the present technology will be described with reference to FIG. 7.

Figure 7:
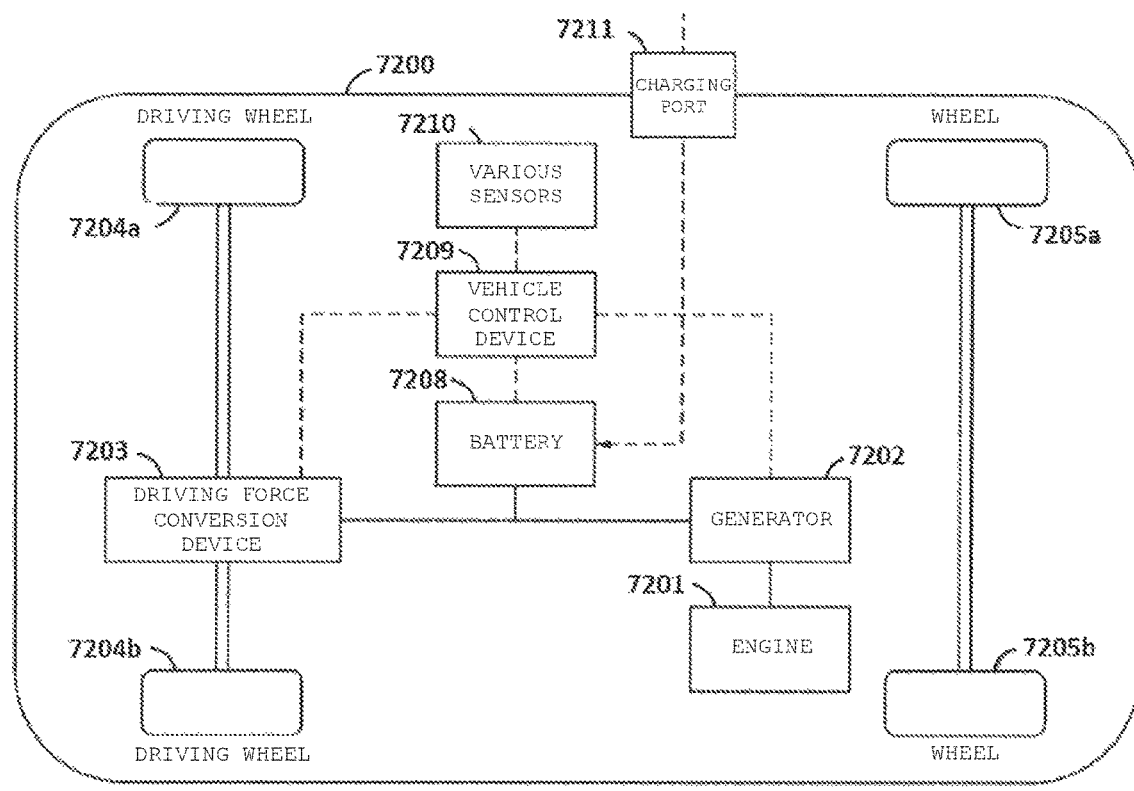
FIG. 7 is a block diagram illustrating a configuration of an application example of the non-aqueous electrolyte secondary battery according to an embodiment of the present technology.

FIG. 7 is a schematic diagram illustrating an example of a configuration of a hybrid vehicle that employs a series hybrid system to which the present technology is applied. The series hybrid system is a vehicle that runs by power and driving force conversion device by using power generated by a generator driven by an engine or power stored once in the battery.

An engine 7201, a generator 7202, a power and driving force conversion device 7203, a driving wheel 7204a, a driving wheel 7204b, a wheel 7205a, a wheel 7205b, a battery 7208, a vehicle control device 7209, various sensors 7210, and a charging port 7211 are mounted on a hybrid vehicle 7200. A power storage device (not illustrated) is applied to the battery 7208.

The hybrid vehicle 7200 runs by using the power and driving force conversion device 7203 as the power source. An example of the power and driving force conversion device 7203 is a motor. The power and driving force conversion device (driving force converter) 7203 is operated by power of the battery 7208, and a rotational force of the power and driving force conversion device 7203 is transmitted to the driving wheels 7204a and 7204b. The power and driving force conversion device 7203 can be applied to any of an AC motor or a DC motor by using direct current-alternating current (DC-AC) or reverse conversion (AC-DC conversion) where necessary. The various sensors 7210 control an engine speed through the vehicle control device 7209, or control an opening degree (throttle opening degree) of a throttle valve (not illustrated). The various sensors 7210 include a speed sensor, an acceleration sensor, and an engine speed sensor.

The rotational force of the engine 7201 is transmitted to the generator 7202, and power generated by the generator 7202 by the rotational force can be stored in the battery 7208.

When the hybrid vehicle decelerates by a braking mechanism (not illustrated), a resistance force at the time of deceleration is applied as a rotational force to the power and driving force conversion device 7203, and a regenerative power generated by the power and driving force conversion device 7203 by this rotational force is stored in the battery 7208.

The battery 7208 is connected to a power source outside the hybrid vehicle. Thus, power can be received from the external power source by using the charging port 7211 as an input port, and the received power can be stored.

Although not illustrated, an information processing apparatus that performs information processing related to vehicle control based on information related to the non-aqueous electrolyte secondary battery may be provided. As such an information processing apparatus, for example, there is an information processing apparatus that displays a remaining battery level based on information on the remaining battery level.

The series hybrid vehicle which drives by the motor by using the power generated with the generator driven by the engine or the power stored once in the battery has been described above. However, the present disclosure can be effectively applied to a parallel hybrid vehicle which appropriately switches between three methods of a mode in which the vehicle drives by only the engine, a mode in which the vehicle drives by only the motor, and a mode in which the vehicle drives by the engine and the motor by using the outputs of the engine and the motor as the driving source. The present technology can be effectively applied to a so-called electric vehicle that drives by only the drive motor without using the engine.

A power storage system according to a fifth embodiment of the present technology includes a power storage device including the non-aqueous electrolyte secondary battery according to the first embodiment of the present technology, a power consumption apparatus that receives power from the non-aqueous electrolyte secondary battery, a control device that controls power supply from the non-aqueous electrolyte secondary battery to the power consumption apparatus, and a power generation device that charges the non-aqueous electrolyte secondary battery. Since the power storage system according to the fifth embodiment of the present technology includes the non-aqueous electrolyte secondary battery according to the first embodiment of the present technology having excellent battery characteristics and excellent reliability, the performance and reliability of the power storage system are improved.

Figure 8:
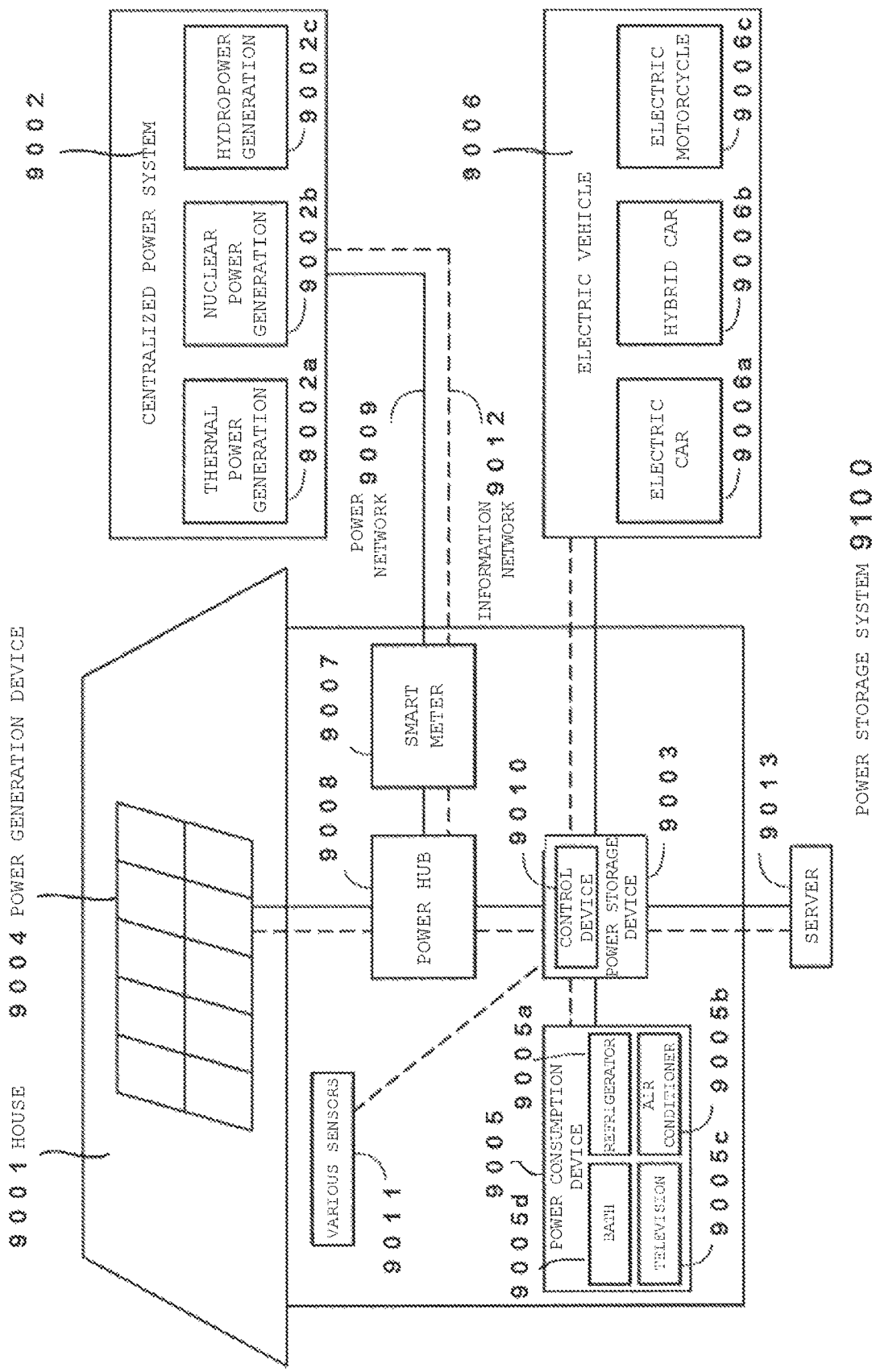
FIG. 8 is a block diagram illustrating a configuration of an application example of the non-aqueous electrolyte secondary battery according to an embodiment of the present technology.

Hereinafter, a residential power storage system which is an example of the power storage system according to the fifth embodiment of the present technology will be described with reference to FIG. 8.

For example, in a power storage system 9100 for a house 9001, power is supplied from a centralized power system 9002 such as a thermal power generation 9002a, a nuclear power generation 9002b, and a hydropower generation 9002c to a power storage device 9003 through a power network 9009, an information network 9012, a smart meter 9007, and a power hub 9008. Power is supplied to the power storage device 9003 from an independent power source such as a home power generation apparatus 9004. The power supplied to the power storage device 9003 is stored. Power used in the house 9001 is supplied by using the power storage device 9003. The same power storage system can be used not only for the house 9001 but also for buildings.

The home power generation apparatus 9004 (power generator), a power consumption apparatus 9005, the power storage device 9003, a control device 9010 (controller) that controls the devices, the smart meter 9007, and a sensor 9011 that acquires various types of information are provided in the house 9001. The devices are connected by the power network 9009 and the information network 9012. A solar cell or a fuel cell is used as the home power generation apparatus 9004, and the generated power is supplied to the power consumption apparatus 9005 and/or the power storage device 9003. The power consumption apparatus 9005 is a refrigerator 9005a, an air conditioner 9005b, a television receiver 9005c, and a bath 9005d. An electric vehicle 9006 is included in the power consumption apparatus 9005. The electric vehicle 9006 is an electric car 9006a, a hybrid car 9006b, and an electric motorcycle 9006c.

The above-described non-aqueous electrolyte secondary battery (battery unit) according to the present technology is applied to the power storage device 9003. The power storage device 9003 includes a non-aqueous electrolyte secondary battery or a capacitor. For example, the power storage device is a lithium ion secondary battery. The lithium ion secondary battery may be a stationary type, or may be used in the electric vehicle 9006. The smart meter 9007 has a function of measuring the usage amount of commercial power and transmitting the measured usage amount to an electric power company. The power network 9009 may be any one or a combination of DC power supply, AC power supply, and non-contact power supply.

The various sensors 9011 are, for example, motion detectors, illuminance sensors, object detection sensors, power consumption sensors, vibration sensors, contact sensors, temperature sensors, and infrared sensors. Information acquired by the various sensors 9011 is transmitted to the control device 9010. Weather conditions and human conditions can be ascertained based on the information from the sensor 9011. Thus, the power consumption apparatus 9005 can be automatically controlled, and it is possible to minimize energy consumption. The control device 9010 can transmit information on the house 9001 to an external power company via the Internet.

The power hub 9008 performs processing such as branching of power lines and DC and AC conversion. A communication method of the information network 9012 connected to the control device 9010 includes a method using a communication interface such as a universal asynchronous receiver-transmitter (UART) and a method using a sensor network according to a wireless communication standard such as Bluetooth (registered trademark), ZigBee, and Wi-Fi. The Bluetooth (registered trademark) system is applied to multimedia communication, and can perform one-to-many connection communication. ZigBee uses a physical layer of Institute of Electrical and Electronics Engineers (IEEE) 802.15.4. IEEE 802.15.4 is a name of a short-range wireless network standard called a personal area network (PAN) or a wireless (W) PAN.

The control device 9010 is connected to an external server 9013. The server 9013 may be managed by any one of the house 9001, the electric power company, and a service provider. Information transmitted and received by the server 9013 is, for example, information on power consumption information, life pattern information, power charges, weather information, natural disaster information, and power transactions. These pieces of information may be transmitted and received from a home power consumption apparatus (for example, a television receiver), but may be transmitted and received from a device outside the home (for example, a cellular phone). These pieces of information may be displayed on a device having a display function, for example, a television receiver, a mobile phone, and a personal digital assistant (PDA).

The control device 9010 that controls the units includes a CPU or processor, a random access memory (RAM), and a read only memory (ROM), and is accommodated in the power storage device 9003 in this example. The control device 9010 is connected to the power storage device 9003, the home power generation apparatus 9004, the power consumption apparatus 9005, various sensors 9011, and the server 9013 via the information network 9012, and has, for example, a function of adjusting the usage amount of commercial power and the amount of power generation. The control device may have a function of performing power transactions in an electric power market.

As described above, the generated power of not only from the centralized power system 9002 such as the thermal power generation 9002a, the nuclear power generation 9002b, and the hydropower generation 9002c but also the home power generation apparatus 9004 (solar power generation or wind power generation) can be stored in the power storage device 9003. Therefore, even though the generated power of the home power generation apparatus 9004 fluctuates, it is possible to perform control such that the amount of power sent to the outside is constant or discharge as much as necessary is performed. For example, the power obtained by the solar power generation may be stored in the power storage device 9003, a midnight power with a low charge may be stored in the power storage device 9003 at night, and the power may be used by discharging the power stored by the power storage device 9003 in a time zone of a high daytime charge.

Although it has been described in this example that the control device 9010 is accommodated in the power storage device 9003, the control device 9010 may be accommodated in the smart meter 9007, or may be independent. The power storage system 9100 may be used for a plurality of homes in an apartment house, or may be used for a plurality of detached houses.

An electric tool according to a sixth embodiment of the present technology includes the non-aqueous electrolyte secondary battery according to the first embodiment of the present technology, and a movable unit to which power is supplied from the non-aqueous electrolyte secondary battery. The electric tool according to the sixth embodiment of the present technology includes the non-aqueous electrolyte secondary battery according to the first embodiment of the present technology having excellent battery characteristics and excellent reliability, the performance and reliability of the electric tool are improved.

Hereinafter, the electric tool according to the sixth embodiment of the present technology will be described with reference to FIG. 9.

Figure 9:
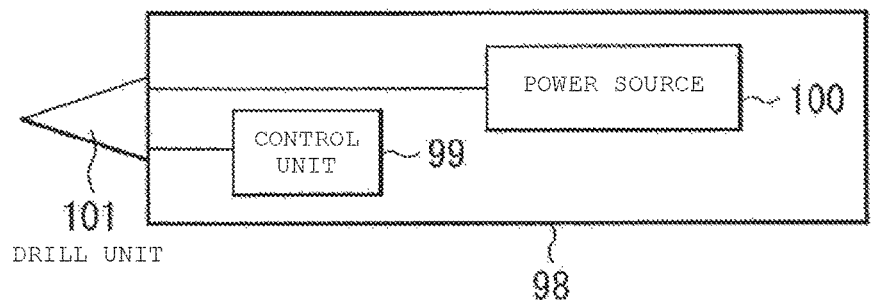
FIG. 9 is a block diagram illustrating a configuration of an application example of the non-aqueous electrolyte secondary battery according to an embodiment of the present technology.

FIG. 9 illustrates a block configuration of the electric tool. This electric tool is, for example, an electric drill, and includes a control unit 99 and a power source 100 inside a tool main body 98 made of a plastic material. For example, a drill unit 101 which is a movable unit is attached to the tool main body 98 so as to be operable (rotatable).

The control unit 99 controls the entire operation of the electric tool (including the use state of the power source 100), and includes, for example, a CPU. The power source 100 includes one or more non-aqueous electrolyte secondary batteries (not illustrated). The control unit 99 supplies the power from the power source 100 to the drill unit 101 according to an operation switch (not illustrated).

An electronic device according to a seventh embodiment of the present technology includes the non-aqueous electrolyte secondary battery of the first embodiment of the present technology. Power is received from the non-aqueous electrolyte secondary battery. As described above, the electronic device according to the seventh embodiment of the present technology is a device that exhibits various functions by using the non-aqueous electrolyte secondary battery as the power source (power supply source) for driving. Since the electronic device according to the seventh embodiment of the present technology includes the non-aqueous electrolyte secondary battery according to the first embodiment of the present technology having excellent battery characteristics and excellent reliability, the performance and reliability of the electronic device are improved.

Figure 10:
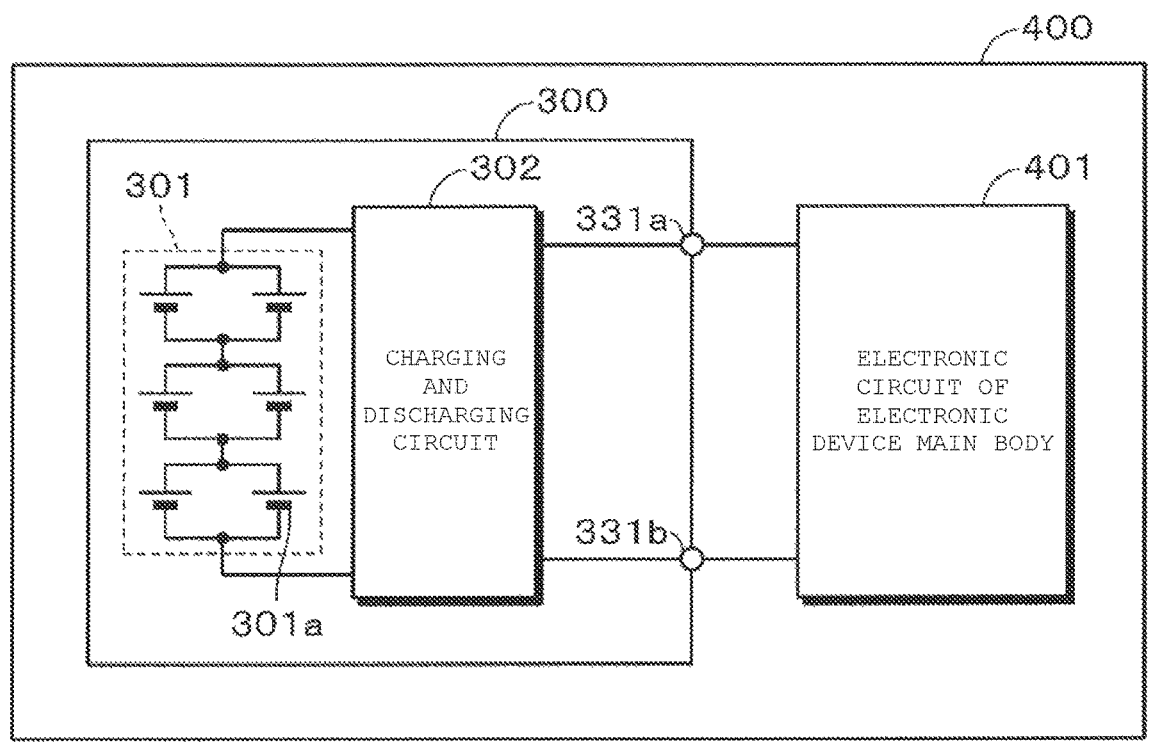
FIG. 10 is a block diagram illustrating a configuration of an application example of the non-aqueous electrolyte secondary battery according to an embodiment of the present technology.

Hereinafter, the electronic device according to the seventh embodiment of the present technology will be described with reference to FIG. 10.

An example of a configuration of an electronic device 400 according to the seventh embodiment of the present technology will be described. The electronic device 400 includes an electronic circuit 401 of an electronic device body and a battery pack 300. The battery pack 300 is electrically connected to the electronic circuit 401 via a positive electrode terminal 331a and a negative electrode terminal 331b. For example, the electronic device 400 has a configuration in which the battery pack 300 can be freely attached and detached by a user. The configuration of the electronic device 400 is not limited thereto, and the battery pack 300 may be built in the electronic device 400 such that the user cannot remove the battery pack 300 from the electronic device 400.

At the time of charging the battery pack 300, the positive electrode terminal 331a and the negative electrode terminal 331b of the battery pack 300 are connected to a positive electrode terminal and a negative electrode terminal of a charger (not illustrated), respectively. Meanwhile, at the time of discharging the battery pack 300 (at the time of using the electronic device 400), the positive electrode terminal 331a and the negative electrode terminal 331b of the battery pack 300 are connected to a positive electrode terminal and a negative electrode terminal of the electronic circuit 401, respectively.

Examples of the electronic device 400 include laptop personal computers, tablet computers, mobile phones (for example, smart phones), personal digital assistants (PDA), imaging devices (for example, digital still cameras and digital video cameras), audio devices (for example, portable audio players), game devices, cordless phones, electronic books, electronic dictionaries, radios, headphones, navigation systems, memory cards, pacemakers, hearing aids, lighting devices, toys, medical devices, and robots, and the present technology is not limited thereto. As a specific example, a head-mounted display and a band type electronic device will be described. The head-mounted display is an electronic device that includes an image display device, a mounting device for mounting the image display device on a head of an observer, and an attachment member for attaching the image display device to the mounting device. The non-aqueous electrolyte secondary battery according to the first embodiment of the present technology is used as the power source for driving. The band type electronic device is an electronic device that includes a plurality of segments connected in a band shape, a plurality of electronic components arranged in the plurality of segments, and a flexible circuit board that connects the plurality of electronic components in the plurality of segments and is disposed in a meander shape in at least one segment. For example, the non-aqueous electrolyte secondary battery according to the first embodiment of the present technology is disposed as the electronic component in the segment.

The electronic circuit 401 includes, for example, a CPU, a peripheral logic unit, an interface unit, and a storage unit, and controls the entire electronic device 400.

The battery pack 300 includes an assembled battery 301 and a charging and discharging circuit 302. The assembled battery 301 is configured such that a plurality of non-aqueous electrolyte secondary batteries 301a is connected in series and/or in parallel. The plurality of non-aqueous electrolyte secondary batteries 301a is connected, for example, in n parallel and m series (n and m are positive integers). FIG. 10 illustrates an example in which six non-aqueous electrolyte secondary batteries 301a are connected in two parallel and three series (2P3S). The first embodiment is used as the non-aqueous electrolyte secondary battery 301a.

At the time of charging, the charging and discharging circuit 302 controls charging of the assembled battery 301.

Meanwhile, at the time of discharging (that is, at the time of using the electronic device 400), the charging and discharging circuit 302 controls discharging for the electronic device 400.

EXAMPLES

Hereinafter, the effects of the present technology will be specifically described in conjunction with examples. The scope of the present technology is not limited to the examples.

A battery was produced by mixing graphite (carbon-based material) and SiO (silicon-based material) which are the negative electrode active materials at a predetermined ratio and pre-doping the lithium ions by the following (Means 1-1) or (Means 2-1).

(Means 1-1) charging of negative electrode in liquid bath of electrolyte-containing liquid and pre-doping charging of lithium ions A wire such as a copper wire was attached to the coated and dried electrode winding hoop, and an electrolyte-containing liquid was prepared by using $LiPF_6$ (1 mol/kg) as an electrolyte and using ethylene carbonate (EC)/propylene carbonate (PC) (mass (%)/mass (%)=50/50) as a solvent. After the wire attached to the electrode winding hoop was immersed in the electrolyte-containing liquid, an opposite electrode was manufactured by using metallic lithium, the metallic lithium was dissolved by a charging operation, and lithium ions were occluded, that is, pre-doped in the negative electrode. Thereafter, a charged (expanded) active material powder in which the lithium ions are occluded in advance, that is, pre-doped by drying, stripping off the electrode mixture, and pulverizing was obtained. After carbon black as a conductive additive and vapor-grown carbon VGCF were mixed with the powder by using the charged powder, the negative electrode plate in which the mixture layer is press-molded by the charged and expanded active material powder by paint production by using N-methylpyrrolidone (M4P) as a coating solvent and polyvinylidene fluoride (PVDF) as a binder, coating on the current collection foil core, drying, press-molding, and obtaining the electrode plate was obtained. The paint production was performed by stirring while degassing with a planetary mixer under vacuum. In the coating and drying, a copper foil was used as the current collection foil core, a paint was coated onto the copper foil by using a predetermined coating device, and the coated electrode was obtained by winding after drying. The coating method was a doctor blade method, and the amount of paint necessary for intermittent coating was supplied onto the copper foil vertically downward by a shutter opening and closing operation at the bottom of a paint supply unit, and the paint was (intermittently) coated on the copper foil in a state in which the copper foil is stretched by the doctor blade with a constant gap with the copper foil. As other coating methods, there are methods such as die coating, gravure, and roll transfer, and any method can be used without any problem. In the press (rolling) molding, the copper foil was pressed (rolled) by a roll press machine, and the density is improved to a mixture volume density on the design specifications by performing the press-molding by the number of passes. The electrode hoop before the winding element is produced was obtained by slitting (cutting) and winding the pressed electrode with an electrode width required at the time of producing the winding element.

After the above-described (Means 1-1), all the processes from "obtaining the powder by drying the electrode-charged negative electrode hoop, stripping the electrode mixture, and pulverizing . . . (omission) . . . " to the "paint production, coating and drying, pressing (rolling), and slitting (cutting)" were performed in a dry atmosphere under a low dew point of −50° C. or less.

(Means 2-1) Lithium ion pre-doping charging of the negative electrode active material powder in the liquid bath of the electrolyte-containing liquid LiPF$_6$ (1 mol/kg) is used as the electrolyte, and EC (ethylene carbonate)/PC (propylene carbonate) (mass (%)/ mass (%)=50/50) is used as the solvent. In the liquid bath of the electrolyte-containing liquid, the liquid is sufficiently impregnated with an active material, and then placed in a conductive metal container having a shape capable of permeating lithium ions, pressed, and the counter electrode is made of metallic lithium. Thus, a charged (expanded) active material powder in which metallic lithium was dissolved and lithium ions were previously occluded, that is, pre-doped, was obtained by a charging operation.

Similar to the method for producing the negative electrode using the charged powder in the above-described Means 1-1 by using the charged powder, the negative electrode plate in which the mixture layer is press-molded by using charged and expanded active material powder was obtained by paint production, coating on the current collection foil core, drying, press-molding, and obtaining the electrode plate.

The pre-doping charge rate of the pre-doped battery is defined as follows.

When a charging capacity at which the maximum amount of lithium ions are charged to the negative electrode single electrode at the metallic lithium counter electrode is W, a ratio when a charging capacity at which the lithium ions are charged in advance in the negative electrode plate is Z at a timing the battery was assembled by using the above-mentioned methods (Means 1-1) and (Means 2-1) is illustrated. That is, the pre-doping charge rate=Z/W (%).

After forming the negative electrode plate by paint production, coating, and press-molding by using the negative electrode active material in the uncharged state, as for the method for performing the process of pre-doping the lithium ions after the battery injection by attaching the metallic lithium to the negative electrode plate before the battery assembly, (Means 3-1) was used as the method for producing the battery of Comparative Example 5 or 6 to be described below.

In the manufacturing of the negative electrode, the negative electrode was obtained by extracting the charged powder obtained by pre-doping the lithium ions and drying, producing a paint by using LiPF$_6$, PVDF, the negative electrode active material, and the conductive agent in the NMP solvent, coating and drying, and press-molding by using the method of (Means 1-1), (Means 2-1), or (Means 3-1).

The positive electrode was obtained by producing a paint by using PVDF, LiCoO$_2$ (positive electrode active material), acetylene black (conductive agent) in the NMP solvent and then using the aluminum current collection foil by the same method as the method subsequent to the paint production in the method for manufacturing the negative electrode.

The battery assembly was completed by setting the form of the battery in the cylindrical type having ICR18650 size, creating the electrode element by a machine constituting a predetermined wound electrode element, inserting predetermined iron into a battery can of which a base material is nickel-plated, performing lead welding, injecting the electrolytic solution prepared in advance with EC/EMC=1/3, LiPF$_6$ 1 mol/kg (≈1.25 mol/L), and sealing by using a sealing body including a predetermined safety valve.

The initial charging was performed at a charge rate of 0.2 ItA, an open circuit voltage defect selection inspection was performed after full charging, and the following battery evaluation was performed for the obtained non-defective batteries.

The test conditions are as follows:
Charge: 0.5 C 4.2 V 5% current Cut (full charge)
Discharge: 0.5 C 2.5 V Cut Next, the following tests were performed, and the results were summarized in Table 1 to be described below.

(Capacity retention rate at 500 cycles at 25° C.)

When a discharge capacity value at the time of initial charging and discharging in a battery shipment state is A and a discharge capacity value after the passage of the charging and discharging is B, a capacity retention rate is expressed by capacity retention rate=B/A×100 (%).

A criteria for determining the capacity retention rate are as follows.

(Determination Criteria)
x: Capacity retention rate less than 70%
Δ: Capacity retention rate 70% or more and less than 75%
◯: Capacity retention rate 70% or more and less than 80%
◉: Capacity retention rate 80% or more (Negative electrode thickness expansion coefficient at 25° C. charge and discharge cycles and capacity retention rate of 50%)

A rate of change in thickness of the negative electrode plate obtained by disassembling and measuring the battery under the full charge voltage is represented. The rate is a ratio obtained by comparing a thickness X of the negative electrode plate obtained at the time of initial charging and discharging in the battery shipment state, that is, at the discharge capacity value A with a negative electrode plate thickness Y at a discharge capacity ratio of 50% after the passage of 25° C. cycle, and is calculated by the following expression.

Negative electrode thickness expansion coefficient at 25° C. charge and discharge cycle and capacity retention rate of 50%=(Y-X)/X×100(%)

In the measuring of the thickness, after stopping in the charging process, the battery was disassembled, the negative electrode plate was extracted, and the thickness of the negative electrode plate was measured with a predetermined precision thickness measurement instrument (manufactured by Mitutoyo Corporation). When can tearing occurred, the negative electrode thickness expansion coefficient at the time of can tearing was measured.

The $LiPF_6$ concentration (mol/L) was measured by the following methods (1) and (2), and the ratio of the concentration "in the negative electrode mixture layer"/the concentration "in the electrolyte present in the battery excluding the negative electrode mixture layer" was obtained, and was represented in Table 1 to be described below.

(1) Measurement of $LiPF_6$ concentration in negative electrode mixture layer

The SEI film on the negative electrode was oxidatively decomposed by the battery of which discharging in which the negative electrode potential is higher than 1 Vvs (Li/Li$^+$) and the battery voltage is 2 V is maintained at 45° C. for 10 hours or more.

After the disassembly of the battery, the negative electrode was extracted, and only the electrode surface was washed by DMC. Subsequently, a predetermined amount was extracted from a sample solution dissolved and concentrated with a concentrated hydrochloric acid solution, and was diluted with a measuring solvent. Thereafter, phosphorus (P) was quantified by ICP measurement, and the amount (mol) of $LiPF_6$ contained per negative electrode was measured.

Since the oxidative decomposition potential is higher than 1 Vvs(Li/Li$^+$) depending on the kind of an electrolyte additive involved in the film formation, the battery holding voltage obtained by oxidatively decomposing the SEI film on the negative electrode is further lowered to 1.5 V or 1.0 V.

Separately, for the negative electrode, after the electrolyte present in the negative electrode mixture layer is dissolved by repeating the solvent extraction with a large amount of DMC solvent by several times, the negative electrode mixture layer was dried in a vacuum state about 90° C. Thereafter, the void volume (mL or mL/g) in the negative electrode mixture layer was measured with a mercury porosimeter.

From the above-described two measurement results, the $LiPF_6$ concentration (mol/L) contained in the negative electrode mixture was calculated.

(2) Similar to the measurement of the $LiPF_6$ concentration in the electrolyte present in the battery excluding the negative electrode mixture layer, a hole was formed in the battery in the discharged state, the battery was placed in a beaker, and the leaked electrolyte was captured. A predetermined amount was extracted from the electrolyte, and was diluted with the measuring solvent. Thereafter, phosphorus (P) was quantified by ICP measurement in the same manner as described above, and the $LiPF_6$ concentration (mol/L) was measured.

(Measurement of negative electrode potential at voltage of 0 V in deep discharging (=positive electrode potential) and discharge curve)

In the batteries of Examples 1 to 18 and the batteries of Comparative Examples 1 to 5 to be described below, after the initial charging and discharging are performed, a three-electrode cell was manufactured, and discharging was performed under the following discharge conditions. The positive electrode potential and the negative electrode potential in this case were measured based on the lithium metal potential, and were represented in Table 1 to be described below. Representative examples are illustrated in FIGS. 1 and 4 to 5.

FIG. 1(A) is a diagram illustrating the results (positive electrode potential, negative electrode potential, and potential difference of discharging in Example 1 and Comparative Example 1), and a vertical axis represents a potential (Potential (Vvs (Li/Li$^+$)) or potential difference (Voltage (V)), and a horizontal axis represents capacity (Capacity (mAh)). FIG. 1(B) is an enlarged view of the discharging result (potential difference) of FIG. 1(A) at a voltage of 0.5 V to 0 V.

Figure 4:
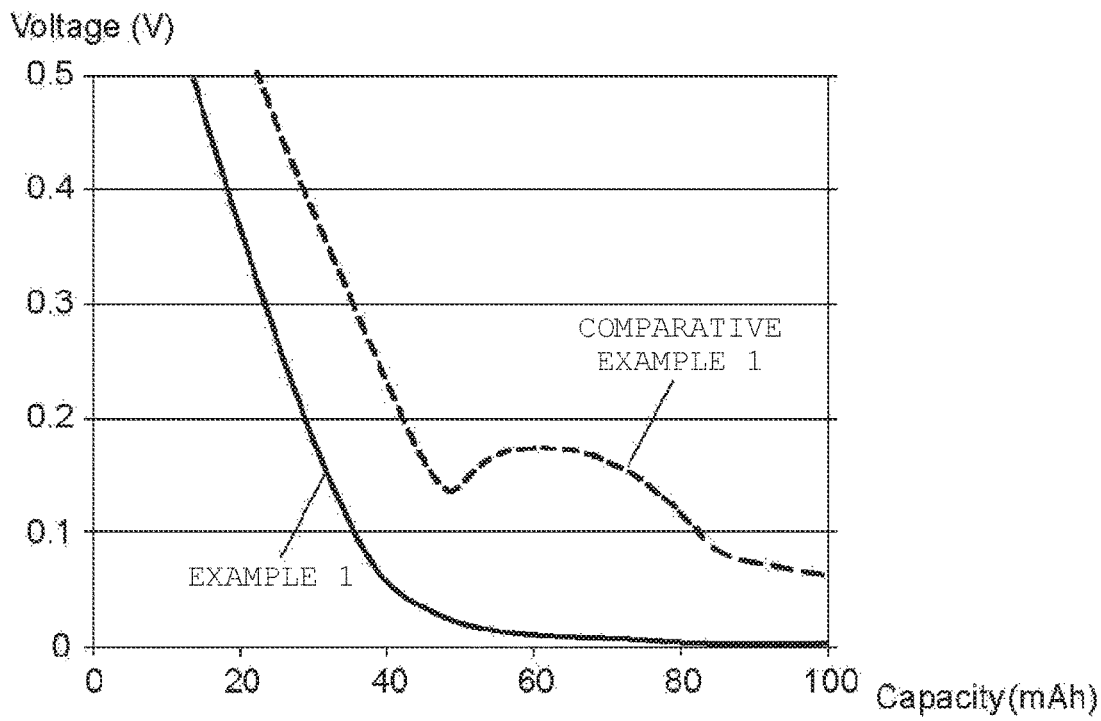
FIG. 4 is a diagram illustrating a result of discharging in Example 1 and Comparative Example 1 according to an embodiment of the present technology.
Figure 5:
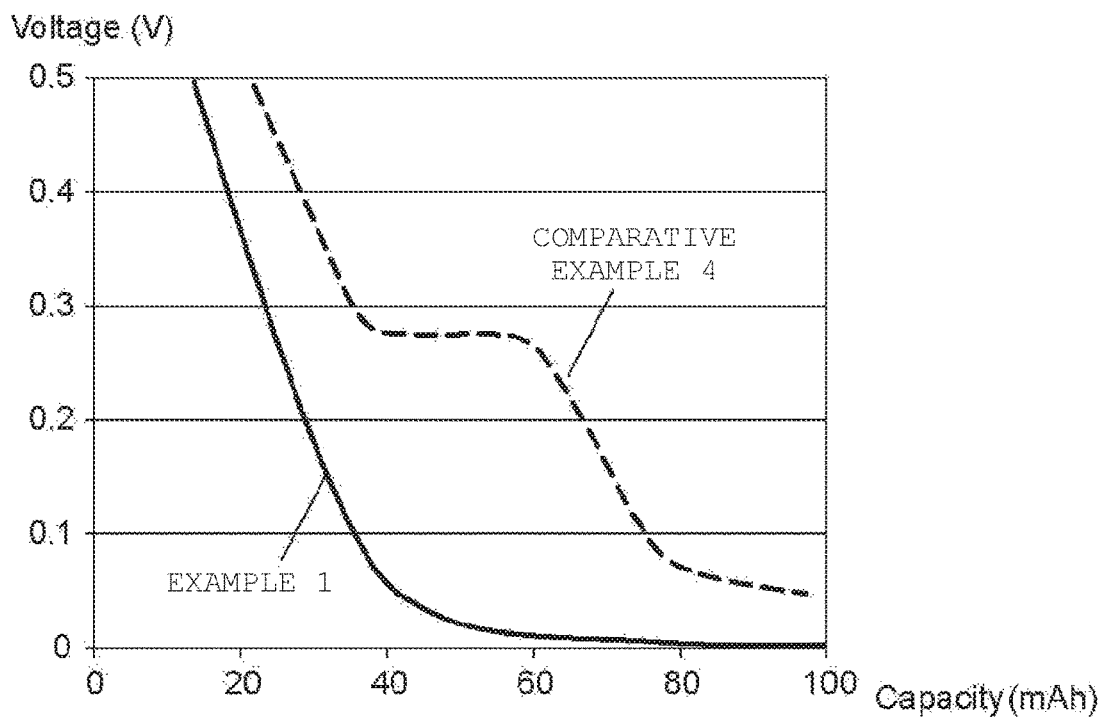
FIG. 5 is a diagram illustrating a result of discharging in Example 1 and Comparative Example 4 according to an embodiment of the present technology.

FIG. 4 is a diagram illustrating the results (potential difference) of discharging at a voltage of 0.5 V to 0 V in Example 1 and Comparative Example 1, and a vertical axis represents a potential difference (Voltage(V)), and a horizontal axis represents capacity (Capacity(mAh)). FIG. 5 is a diagram illustrating the results (potential difference) of discharging at a voltage of 0.5 V to 0 V in Example 1 and Comparative Example 4, and a vertical axis represents a potential difference (Voltage (V)), and a horizontal axis represents capacity (Capacity(mAh)).

In the producing of the three-electrode cell, after the terminals of the positive electrode, negative electrode, and the lithium electrode are produced, a small hole is formed in a part of a bottom of the battery can, and about ½ of the battery and metal lithium are immersed in the electrolytic solution. The three electrodes of the positive electrode, the negative electrode, and the metallic lithium inside the battery are immersed in the same electrolytic solution, and the changes of the positive and negative electrode potentials can be measured based on the metallic lithium which is the most basic potential.

Discharge conditions 1 to 3

(Discharge condition 1) 0.1 ItA CC discharge voltage 1.5 V Cut (Discharge condition 2) 0.01 ItA CC discharge voltage 0.5 V Cut (Discharge condition 3) 0.001 ItA CC discharge voltage 0 V Cut The measurement was performed using NR-500 WAVEL-OGGER manufactured by KEYENCE CORPORATION. The results are represented in Table 1 to be described below. In the discharge curve drawn by setting the X axis as the capacity and the Y axis as the voltage in the discharging at a voltage of 0.5 V to 0 V under the discharge condition 3, the results for the presence or absence of the elliptical peak (Comparative Example 1) illustrated in FIG. 4 and the presence or absence of the plateau-like (Comparative Example 4) illustrated in FIG. 5 are represented in Table 1 to be described below.

The peak occurs by dissolving a part of a can material when the negative electrode potential exceeds the dissolved potential of the battery can (3.25 to 3.3 Vvs(Li/Li$^+$)), and indicates that the negative electrode potential increases to the dissolved potential.

In the present technology, since the lithium ions of irreversible capacity of the negative electrode are already consumed by the above-described pre-doping means and the capacity of the irreversible capacity is compensated, in the deep discharging up to the voltage of 0 V after the assembled battery is charged, the negative electrode potential at the voltage of 0 V (=positive electrode potential) is shifted to the low side, that is, the low potential side, as compared to the battery in which the capacity of the irreversible capacity is not compensated. Thus, since the negative electrode potential is less than the dissolved potential of the can member, the above-described peak does not occur.

Details of Examples 1 to 18 and Comparative Examples 1 to 5 will be described below. A method for removing Li from the negative electrode is not different between a case where the pre-doping is performed and in a case where the pre-doping is not performed. For the positive electrode as a supply source of the lithium ions to the negative electrode, when the assembled battery is initially charged and is fully charged as described above, the batteries according to the examples or the batteries according to the comparative examples that are not overcharged by adjusting a capacity (%) equivalent to the irreversible capacity in the negative electrode capacity at the time of initial charging so as to be added to the full charge capacity at the time of initial charging of the battery were produced.

Example 1

In a condition in which the negative electrode active material contained 90 mass % graphite and 10 mass % of SiO, the above-described (Means 1-1) was used as the means for pre-doping the lithium ions, the pre-doping charge rate (%) was 100% (full charge), and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 1.

Example 2

In a condition in which the negative electrode active material contained 50 mass % graphite and 50 mass % of SiO, the above-described (Means 1-1) was used as the means for pre-doping the lithium ions, the pre-doping charge rate (%) was 100% (full charge), and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 2.

Example 3

In a condition in which the negative electrode active material contained 10 mass % graphite and 90 mass % of SiO, the above-described (Means 1-1) was used as the means for pre-doping the lithium ions, the pre-doping charge rate (%) was 100% (full charge), and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 3.

Example 4

In a condition in which the negative electrode active material contained 0 mass % graphite and 100 mass % of SiO, the above-described (Means 1-1) was used as the means for pre-doping the lithium ions, the pre-doping charge rate (%) was 100% (full charge), and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 4.

Example 5

In a condition in which the negative electrode active material contained 0 mass % graphite and 100 mass % of SiO, the above-described (Means 2-1) was used as the means for pre-doping the lithium ions, the pre-doping charge rate (%) was 100% (full charge), and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 5.

Example 6

In a condition in which the negative electrode active material contained 90 mass % graphite and 10 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 6.

Example 7

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 7.

Example 8

In a condition in which the negative electrode active material contained 10 mass % graphite and 90 mass % of SiO, the above-described (Means 1-1) was used as the means for pre-doping the lithium ions, the pre-doping charge

Example 9

In a condition in which the negative electrode active material contained 0 mass % graphite and 100 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 9.

Example 10

In a condition in which the negative electrode active material contained 0 mass % graphite and 100 mass % of SiO, the above-described (Means 2-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 10.

Example 11

In a condition in which the negative electrode active material contained 90 mass % graphite and 10 mass % of SiO, the above-described (Means 1-1) was used as the means for pre-doping the lithium ions, the pre-doping charge rate (%) was 10%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 11.

Example 12

In a condition in which the negative electrode active material contained 50 mass % graphite and 50 mass % of SiO, the above-described (Means 1-1) was used as the means for pre-doping the lithium ions, the pre-doping charge rate (%) was 10%, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 12.

Example 13

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 2.0 as the electrolyte concentration, a battery produced according to the above-described method was obtained as Example 13.

Example 14

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 2.5 as the electrolyte concentration, a battery produced according to the above-described method was obtained as Example 14.

Example 15

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 2.6 as the electrolyte concentration, a battery produced according to the above-described method was obtained as Example 15.

Example 16

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.2 as the electrolyte concentration, a battery produced according to the above-described method was obtained as Example 16.

Example 17

In a condition in which the negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 1.1 as the electrolyte concentration, a battery produced according to the above-described method was obtained as Example 17.

Example 18

In a condition in which the negative electrode active material contained 50 mass % graphite and 50 mass % of SiO, the above-described (Means 3-1) was used as the means for pre-doping the lithium ions, the negative electrode plate was produced by mixing $LiPF_6$ at a stage of paint production for the negative electrode, and the ratio of the concentration "in the negative electrode mixture layer"/the concentration "in the electrolytic solution present in the battery excluding the negative electrode mixture layer" was 1.8 as the electrolyte concentration, a battery produced according to the above-described method was obtained as Example 18.

Comparative Example 1

In a condition in which the negative electrode active material contained 90 mass % graphite and 10 mass % of SiO, the lithium ions were not pre-doped, the negative electrode plate was produced without mixing $LiPF_6$ at a stage of paint production for the negative electrode, and the ratio of the concentration "in the negative electrode mixture layer"/the concentration "in the electrolytic solution present in the battery excluding the negative electrode mixture layer" was 1.0 as the electrolyte concentration, a battery produced according to the above-described method was obtained as Comparative Example 1.

Comparative Example 2

The negative electrode active material contained 50 mass % graphite and 50 mass % of SiO, the above-described (Means 1-1) was used as the means for pre-doping the lithium ions, the pre-doping charge rate (%) was 50%, and the ratio of the concentration "in the negative electrode mixture layer"/the concentration "in the electrolytic solution present in the battery excluding the negative electrode mixture layer" was 0.9 as the electrolyte concentration. A battery was produced according to the above-described method. However, after a sufficient amount of electrolyte solution in which the concentration of $LiPF_6$ is adjusted so as to be reduced by 10% in advance was injected in the impregnation of the electrode element, the electrolyte solution in which the concentration is not adjusted was injected, and a battery in which the concentration ratio is 0.9 was produced. This produced battery was obtained as Comparative Example 2.

Comparative Example 3

In a condition in which the negative electrode active material contained 50 mass % graphite and 50 mass % of SiO, the lithium ions were not pre-doped, the negative electrode plate was produced by mixing $LiPF_6$ at a stage of paint production for the negative electrode, and the ratio of the concentration "in the negative electrode mixture layer"/the concentration "in the electrolytic solution present in the battery excluding the negative electrode mixture layer" was 1.0 as the electrolyte concentration, a battery produced according to the above-described method was obtained as Comparative Example 3.

Comparative Example 4

In a condition in which the negative electrode active material contained 100 mass % graphite and 0 mass % of SiO, the lithium ions were not pre-doped, the negative electrode plate was produced without mixing $LiPF_6$ at a stage of paint production for the negative electrode, and the ratio of the concentration "in the negative electrode mixture layer"/the concentration "in the electrolytic solution present in the battery excluding the negative electrode mixture layer" was 1.0 as the electrolyte concentration, a battery produced according to the above-described method was obtained as Comparative Example 4.

Comparative Example 5

In a condition in which the negative electrode active material contained 50 mass % graphite and 50 mass % of SiO, the above-described (Means 3-1) was used as the means for pre-doping the lithium ions, the negative electrode plate was produced without mixing $LiPF_6$ at a stage of paint production for the negative electrode, and the ratio of the concentration "in the negative electrode mixture layer"/the concentration "in the electrolytic solution present in the battery excluding the negative electrode mixture layer" was 1.0 as the electrolyte concentration, a battery produced according to the above-described method was obtained as Comparative Example 5.

TABLE 1

| | Active material ratio (mass %) | | Pre-doping of Li ions and means for producing negative electrode | | | Pre-doping Charge rate (%) | Initial charging Negative electrode charge rate (%) = initial charging amount/ negative electrode capacity | $LiPF_6$ concentration Ratio of "in negative electrode mixture"/"in electrolytic solution present in cell excluding negative electrode |
|---|---|---|---|---|---|---|---|---|
| | | | Means 1-1 (electrode charge ⇒ Pulverize ⇒ electrode by pressing charged powder) | Means 2-1 (powder charge (⇒ Pulverize) ⇒ electrode by pressing charged powder) | Means 3-1 (electrode by pressing uncharged powder ⇒ electrode charge) | | | |
| | Graphite | SiO | | | | | | |
| Example 1 | 90 | 10 | ○ | — | — | 100 | 100 + L | 1.8 |
| Example 2 | 50 | 50 | ○ | — | — | 100 | 100 + L | 1.8 |
| Example 3 | 10 | 90 | ○ | — | — | 100 | 100 + L | 1.8 |
| Example 4 | 0 | 100 | ○ | — | — | 100 | 100 + L | 1.8 |
| Example 5 | 0 | 100 | — | ○ | — | 100 | 100 + L | 1.8 |
| Example 6 | 90 | 10 | ○ | — | — | 50 | 100 + L | 1.8 |
| Example 7 | 50 | 50 | ○ | — | — | 50 | 100 + L | 1.8 |
| Example 8 | 10 | 90 | ○ | — | — | 50 | 100 + L | 1.8 |
| Example 9 | 0 | 100 | ○ | — | — | 50 | 100 + L | 1.8 |
| Example 10 | 0 | 100 | — | ○ | — | 50 | 100 + L | 1.8 |
| Example 11 | 90 | 10 | ○ | — | — | 10 | 100 + L | 1.8 |
| Example 12 | 50 | 50 | ○ | — | — | 10 | 100 + L | 1.8 |
| Example 13 | 50 | 50 | ○ | — | — | 50 | 100 + L | 2 |
| Example 14 | 50 | 50 | ○ | — | — | 50 | 100 + L | 2.5 |
| Example 15 | 50 | 50 | ○ | — | — | 50 | 100 + L | 2.6 |

TABLE 1-continued

| | | | | | | | | |
|---|---|---|---|---|---|---|---|---|
| Example 16 | 50 | 50 | ○ | — | — | 50 | 100 + L | 1.2 |
| Example 17 | 50 | 50 | ○ | — | — | 50 | 100 + L | 1.1 |
| Example 18 | 50 | 50 | — | — | ○ | 50 | 100 + L | 1.8 |
| Comparative Example 1 | 90 | 10 | — | — | — | 0 | 100 | 1.0 |
| Comparative Example 2 | 50 | 50 | ○ | — | — | 50 | 100 + L | 0.9 |
| Comparative Example 3 | 50 | 50 | — | — | — | 0 | 100 | 1.0 |
| Comparative Example 4 | 100 | 0 | — | — | — | 0 | 100 | 1.0 |
| Comparative Example 5 | 50 | 50 | — | — | ○ | 50 | 100 + L | 1.0 |

| | Expansion coefficient of negative electrode thickness at 25° C. cycle Expansion coefficient (%) of negative electrode thickness at 25° C. cycle and capacity | Discharge capacity retention rate at 25° C. cycle Capacity retention rate (%) at 500 cycles | Deep discharge (overdischarge up to voltage 0 V) | | Determination | Note |
|---|---|---|---|---|---|---|
| | | | Negative electrode potential at voltage 0 V (Vvs(Li/Li+)) | X axis (capacity) Y axis (voltage) curve voltage of 0.5 V to 0 V, Elliptical or plateau-like peak voltage | | |
| Example 1 | 10% | 86 | 3.10 | Absence | ◉ | |
| Example 2 | 11% | 85 | 3.07 | Absence | ◉ | |
| Example 3 | 12% | 86 | 3.05 | Absence | ◉ | |
| Example 4 | 12% | 85 | 3.02 | Absence | ◉ | |
| Example 5 | 12% | 87 | 3.03 | Absence | ◉ | |
| Example 6 | 15% | 83 | 3.12 | Absence | ◉ | |
| Example 7 | 15% | 83 | 3.1 | Absence | ◉ | |
| Example 8 | 16% | 83 | 3.09 | Absence | ◉ | |
| Example 9 | 16% | 83 | 3.08 | Absence | ◉ | |
| Example 10 | 16% | 83 | 3.08 | Absence | ◉ | |
| Example 11 | 17% | 78 | 3.19 | Absence | ◉ | |
| Example 12 | 18% | 77 | 3.17 | Absence | ◉ | |
| Example 13 | 15% | 83 | 3.17 | Absence | ◉ | |
| Example 14 | 15% | 80 | 3.16 | Absence | ◉ | |
| Example 15 | 15% | 77 | 3.16 | Absence | ○ | Increase in battery resistance |
| Example 16 | 15% | 82 | 3.17 | Absence | ◉ | |
| Example 17 | 15% | 75 | 3.18 | Absence | ○ | |
| Example 18 | 25% | 70 | 3.17 | Absence | Δ | Decrease in current collection performance |
| Comparative Example 1 | 25% | 65 | 3.35 | Presence | X | |
| Comparative Example 2 | 20% | 68 | 3.20 | Absence | ⊙ | Decrease in pre-doping charging efficiency |
| Comparative Example 3 | (30%) | — | — | — | X | Can tearing NG |
| Comparative Example 4 | 15% | 68 | 3.38 | Presence | X | |
| Comparative Example 5 | 25% | 57 | 3.18 | Absence | X | Decrease in current collection performance |

( ) is timing of can tearing
Retention rate Less than 70%: X
Retention rate 70% or more and less than 75%: Δ
Retention rate 75% or more and less than 80%: ○
Retention rate 80% or more: ⊙

From the results of Table 1, when the ratio of carbon/SiO of the negative electrode active material is increased, the results that a capacity retention rate at 500 cycles was high and an electrode thickness expansion coefficient of initial state comparison at a capacity retention rate rated capacity ratio of 50% was low were obtained in the batteries of Examples 1 to 18 produced by using the negative electrode plate obtained by performing the negative electrode plate press-molding by using the expanded active material powder charged (Li-ion pre-doped) by the above-described (Means 1-1), (Means 2-1), or (Means 3-1), as compared to the batteries of Comparative Examples 1, 3, and 4 in which the negative electrode plate was not produced. The same results were obtained even in the system having the improved SiO ratio.

The silicon oxide (SiO) was used as the silicon-based material in the batteries of Examples 1 to 18, but the same results were obtained even though metallic silicon, silicon fluoride, silicon alloy, or a mixture of at least two thereof was used. Since the negative electrode plate obtained by performing the negative electrode press-molding by using the changed and expanded active material powder through the lithium ion pre-doping was used, the change of the negative electrode thickness attendant upon charging and discharging due to the active material expansion and contraction at the time of charging and discharging the assembled battery is reduced, and the stress with which the mixture layer is peeled off from the current collection foil or the active material is isolated is decreased. As a result, it is considered that the current collection performance is retained. It is considered that the electrode thickness fluctuation at cycles is decreased and the cycle characteristics are favorable by performing the press-molding after the active material is charged and expanded as much as possible.

As for the electrolyte concentration, as represented in Table 1, when the ratio of the concentration "in the negative electrode mixture"/the concentration "in the electrolytic solution present in the battery excluding the negative electrode" is preferably more than 1 and 2.5 or less, and more preferably 1.2 or more and 2.0 or less in order to achieve the favorable charge and discharge cycle characteristics.

Since the lithium ions for the irreversible capacity of the negative electrode were already consumed by the pre-doping means and the capacity for the irreversible capacity was compensated, in the deep discharging up to a voltage of 0 V after the charging of the assembled battery, the negative electrode potential at the voltage of 0 V (=positive electrode potential) is shifted to a low side, that is, a low potential side as compared to the battery in which the irreversible capacity of the battery is not compensated. Thus, since the negative electrode potential is less than a dissolved potential of a can material, the can material is not dissolved, and thus, an elliptical or plateau-like peak does not occur.

Although it has been described in Examples 1 to 18 that a nickel-plated can using iron as a base material is used, even though aluminum and stainless steel cans are used as other exterior cans or a laminate member of aluminum and stainless steel foil is used as an exterior member, the present technology can obtain the same effects. As described above, the non-aqueous electrolyte secondary battery according to the present technology is, for example, a cylindrical or square lithium ion secondary battery or a laminate film type lithium ion secondary battery.

In the cylindrical type, since the nickel-plated can using iron as the base material is usually used, in a discharge curve in the deep discharging in a region of the voltage of 0 V, the elliptical or plateau-like peak occurs in Comparative Example 1 or 4 in which the pre-doping is not performed, whereas the elliptical or plateau-like peak does not occur in Examples 1 to 18 in which the pre-doping is performed.

In the square type, the aluminum can or stainless steel can is used in addition to the nickel-plated can using iron as the base material. In the case of the aluminum can, since the can side becomes the positive electrode, the above-mentioned peak does not occur. In the case of the stainless steel can, the can side becomes the negative electrode, but since the dissolved potential of stainless steel is much higher than about 3.35 V(Li/Li$^+$) which is the negative electrode potential at the voltage of 0 V, the can material is not dissolved, and thus, the elliptical or plateau-like peak does not occur.

In the laminate film type, since the can is molded by covering the aluminum or stainless steel foil with an insulating film, the positive electrode or the negative electrode and the laminate are insulated. Accordingly, since there is no reaction with metal such as aluminum or stainless steel within the laminate which is an exterior member, the elliptical or plateau-like peak does not occur.

Therefore, the non-aqueous electrolyte secondary battery according to the present technology includes, for example, the battery can including the iron-containing base material, and the base material is nickel-plated. The elliptical or plateau-like peak does not occur in a region in which the battery voltage is 0.5 V to 0 V in a discharge curve obtained in the deep discharging at a current rate of 0.001 ItA reaching a battery voltage of 0 V.

Hereinafter, the present technology will be more specifically described in conjunction with Application Examples 1 to 5.

Figure 11:
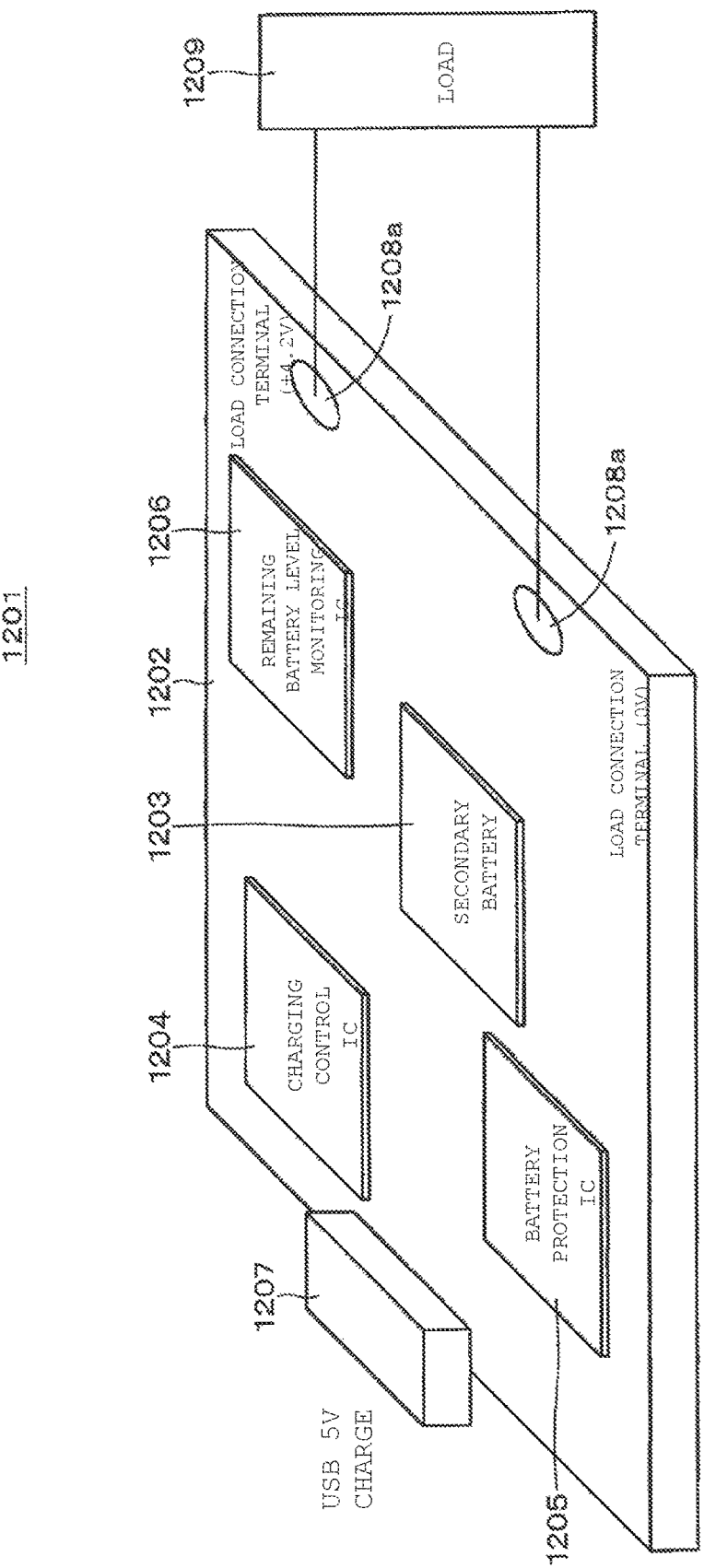
FIG. 11 is a diagram illustrating a configuration of Application Example of the non-aqueous electrolyte secondary battery according to an embodiment of the present technology.

As illustrated in FIG. 11, the above-described non-aqueous electrolyte secondary battery can be mounted on a printed circuit board 1202 (hereinafter, referred to as "PCB") together with a charging circuit. For example, a secondary battery (non-aqueous electrolyte secondary battery) 1203 and an electronic circuit such as a charging circuit can be mounted on the PCB 1202 by a reflow process. A module in which the secondary battery (non-aqueous electrolyte secondary battery) 1203 and the electronic circuit such as the charging circuit are mounted on the PCB 1202 is referred to as a battery module 1201. The battery module 1201 has a card type configuration as necessary, and thus, a portable card type mobile battery can be obtained.

A charging control integrated circuit (IC) 1204, a battery protection IC 1205, and a remaining battery level monitoring IC 1206 are also formed on the PCB 1202. The battery protection IC 1205 controls the charging and discharging operations such that the charge voltage does not become excessive at the time of charging and discharging, an overcurrent due to a load short circuit is prevented from flowing, and overdischarging does not occur.

A universal serial bus (USB) interface 1207 is attached to the PCB 1202. The secondary battery (non-aqueous electrolyte secondary battery) 1203 is charged by power supplied through the USB interface 1207. In this case, the charging operation is controlled by the charging control IC 1204.

A predetermined power (for example, a voltage of 4.2 V) is supplied to a load 1209 from load connection terminals 1208*a* and 1208*b* attached to the PCB 1202. A remaining battery level of the secondary battery (non-aqueous electrolyte secondary battery) 1203 is monitored by the remaining battery level monitoring IC 1206, and thus, an indication (not illustrated) indicating the remaining battery level can be seen from the outside. The USB interface 1207 may be used for load connection.

A specific example of the above-described load 1209 is as follows.

A. wearable devices (sports watches, watches, and hearing aids),

B. IoT terminals (sensor network terminals),

C. amusement devices (portable game terminal and game controllers),

D. IC board embedded battery (real-time clock IC),

E. energy harvesting equipment (power storage elements for power generation elements such as solar power generation, thermoelectric power generation, and vibration power generation).

Currently, many persons carry a plurality of credit cards. However, there is a problem that the risk of loss and theft increases as the number of credit cards increases. Therefore, a card called a universal credit card in which functions such as the plurality of credit cards and point cards are integrated into one card has been put into practical use. For example, since information such as numbers and expiration dates of various credit cards and point cards can be stored in this card, when one card is inserted in a wallet, it is possible to select and use a favorite card whenever the user wants.

Figure 12:
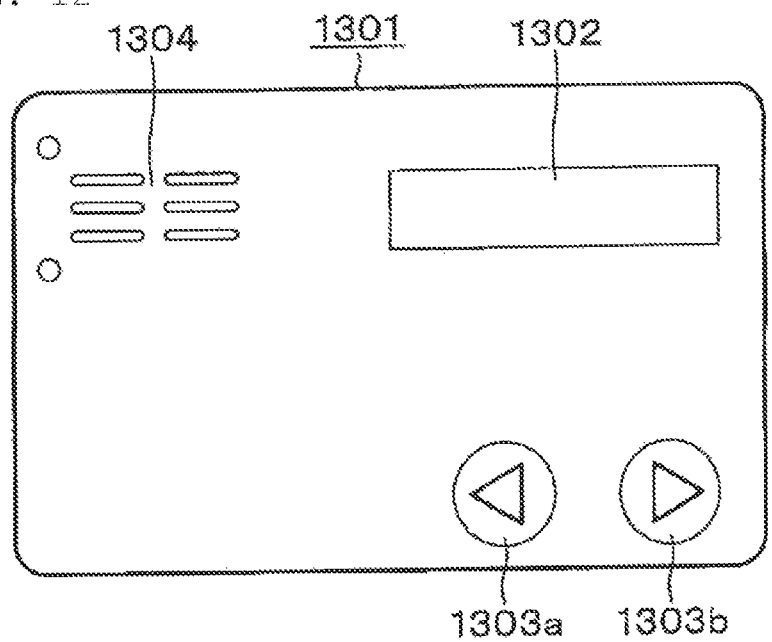
FIG. 12 is a diagram illustrating an example of a configuration of Application Example of the non-aqueous electrolyte secondary battery according to an embodiment of the present technology.

FIG. 12 illustrates an example of a configuration of a universal credit card 1301. The universal credit card has a card shape, and incorporates an IC chip and the non-aqueous electrolyte secondary battery (not illustrated) according to the present technology. The universal credit card is provided with a low-power-consumption display 1302 and an operation unit, for example, direction keys 1303a and 1303b. A charging terminal 1304 is provided on a surface of the universal credit card 1301.

For example, the user can specify a credit card loaded in advance on the universal credit card 1301 by operating the direction keys 1303a and 1303b while looking at the display 1302. When a plurality of credit cards is loaded in advance, information indicating the credit cards is displayed on the display 1302, and the user can designate a desired credit card by operating the direction keys 1303a and 1303b. Thereafter, the credit card can be used like a conventional credit card. The above-described card is an example, and the non-aqueous electrolyte secondary battery according to the present technology can be applied to any electronic card other than the universal credit card 1301.

Examples of a wearable terminal include wristband type electronic devices. Among them, a wristband type activity meter is also called a smart band, and it is possible to obtain data on human activities such as the number of steps, a movement distance, calories burned, sleep amount, and heart rate by wrapping around the wrist. The acquired data can also be managed by a smartphone. The wristband type activity meter can also have a mail transmission and reception function. For example, the wristband type activity meter having a mail notification function of notifying the user of an incoming mail with a light emitting diode (LED) lamp and/or vibration is used.

Figure 13:
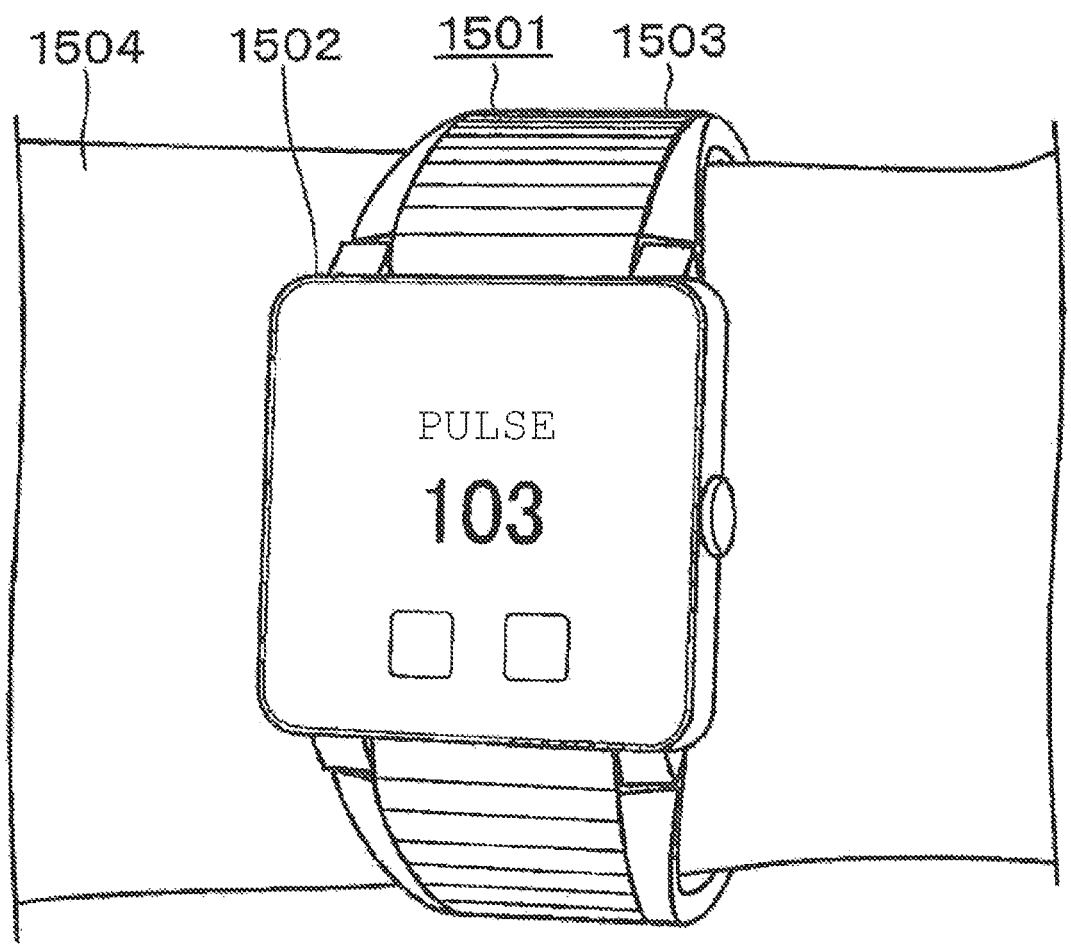
FIG. 13 is a diagram illustrating an example of a configuration of Application Example of the non-aqueous electrolyte secondary battery according to an embodiment of the present technology.
Figure 14:
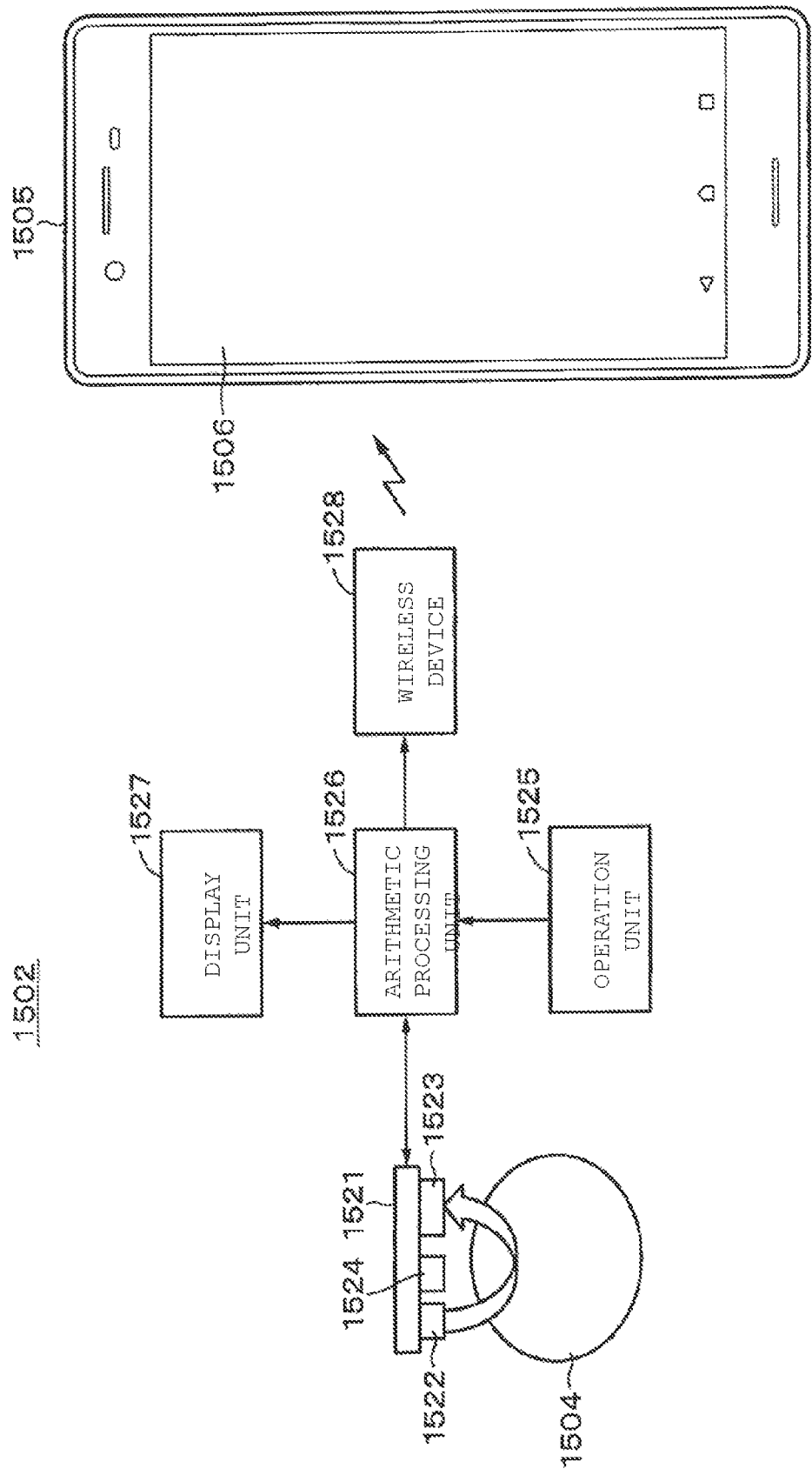
FIG. 14 is a diagram illustrating an example of a configuration of Application Example of the non-aqueous electrolyte secondary battery according to an embodiment of the present technology.

FIG. 13 and FIG. 14 illustrate an example of the wristband type activity meter that measures, for example, a pulse. FIG. 13 illustrates an external configuration example of a wristband type activity meter 1501. FIG. 14 illustrates a configuration example of a main body 1502 of the wristband type activity meter 1501.

The wristband type activity meter 1501 is a wristband type measuring device that measures, for example, a pulse of a subject by an optical method. As illustrated in FIG. 13, the wristband type activity meter 1501 includes a main body 1502 and a band 1503, and the band 1503 is attached to an arm (wrist) 1504 of the subject like a wristwatch. The main body 1502 irradiates a portion including the arm 1504 of the subject with measurement light having a predetermined wavelength, and measures the pulse of the subject based on the intensity of the returned light.

The main body 1502 includes a substrate 1521, an LED 1522, a light receiving IC 1523, a light shielding body 1524, an operation unit 1525, an arithmetic processing unit 1526, a display unit 1527, and a wireless device 1528. The LED 1522, the light receiving IC 1523, and the light shielding body 1524 are provided on the substrate 1521. Under the control of the light receiving IC 1523, the LED 1522 irradiates the portion including the pulse of the arm 1504 of the subject with the measurement light having the predetermined wavelength.

The light receiving IC 1523 receives the light returned after the measurement light is applied to the arm 1504. The light receiving IC 1523 generates a digital measurement signal indicating the intensity of the returned light, and supplies the generated measurement signal to the arithmetic processing unit 1526.

The light shielding body 1524 is provided between the LED 1522 and the light receiving IC 1523 on the substrate 1521. The light shielding body 1524 prevents the measurement light from the LED 1522 from being directly incident on the light receiving IC 1523.

The operation unit 1525 is constituted by various operation members such as buttons and switches, and is provided on a surface of the main body 1502. The operation unit 1525 is used to operate the wristband type activity meter 1501 and supplies a signal indicating an operation content to the arithmetic processing unit 1526.

The arithmetic processing unit 1526 performs arithmetic processing for measuring the pulse of the subject based on the measurement signal supplied from the light receiving IC 1523. The arithmetic processing unit 1526 supplies the measurement result of the pulse to the display unit 1527 and the wireless device 1528.

The display unit 1527 is a display device such as a liquid crystal display (LCD), and is provided on the surface of the main body 1502. The display unit 1527 displays the measurement result of the pulse of the subject.

The wireless device 1528 transmits the measurement result of the pulse of the subject to an external device through wireless communication of a predetermined method. For example, as illustrated in FIG. 14, the wireless device 1528 transmits the measurement result of the pulse of the subject to a smartphone 1505, and displays the measurement result on a screen 1506 of the smartphone 1505. Data of the measurement result is managed by the smartphone 1505, and the measurement result can be viewed by the smartphone 1505 or stored in a server on the network. Any method can be adopted as the communication method of the wireless device 1528. The light receiving IC 1523 can also be used when a pulse at a part (for example, finger or earlobe) other than the arm 1504 of the subject is measured.

The above-described wristband type activity meter 1501 can accurately measure a pulse wave and pulse of the subject by removing the influence of body movement through signal processing in the light receiving IC 1523. For example, even though the subject performs intense exercise such as running, the pulse wave and pulse of the subject can be accurately measured. For example, even when the subject wears the wristband type activity meter 1501 for a long time and performs the measurement, the influence of the body movement of the subject can be removed and the pulse wave and the pulse can be continuously measured accurately.

The power consumption of the wristband type activity meter 1501 can be reduced by reducing the amount of calculation. As a result, for example, it is possible to perform the measurement by wearing the wristband type activity meter 1501 on the subject for a long time without performing charging or battery replacement.

For example, a thin battery is accommodated, as a power source, in the band 1503. The wristband type activity meter 1501 includes an electronic circuit of a main body and a battery pack. For example, the battery pack is attachable and detachable by the user. The electronic circuit is a circuit included in the above-described main body 1502. The present technology can be applied when the non-aqueous electrolyte secondary battery is used as the battery.

Figure 15:
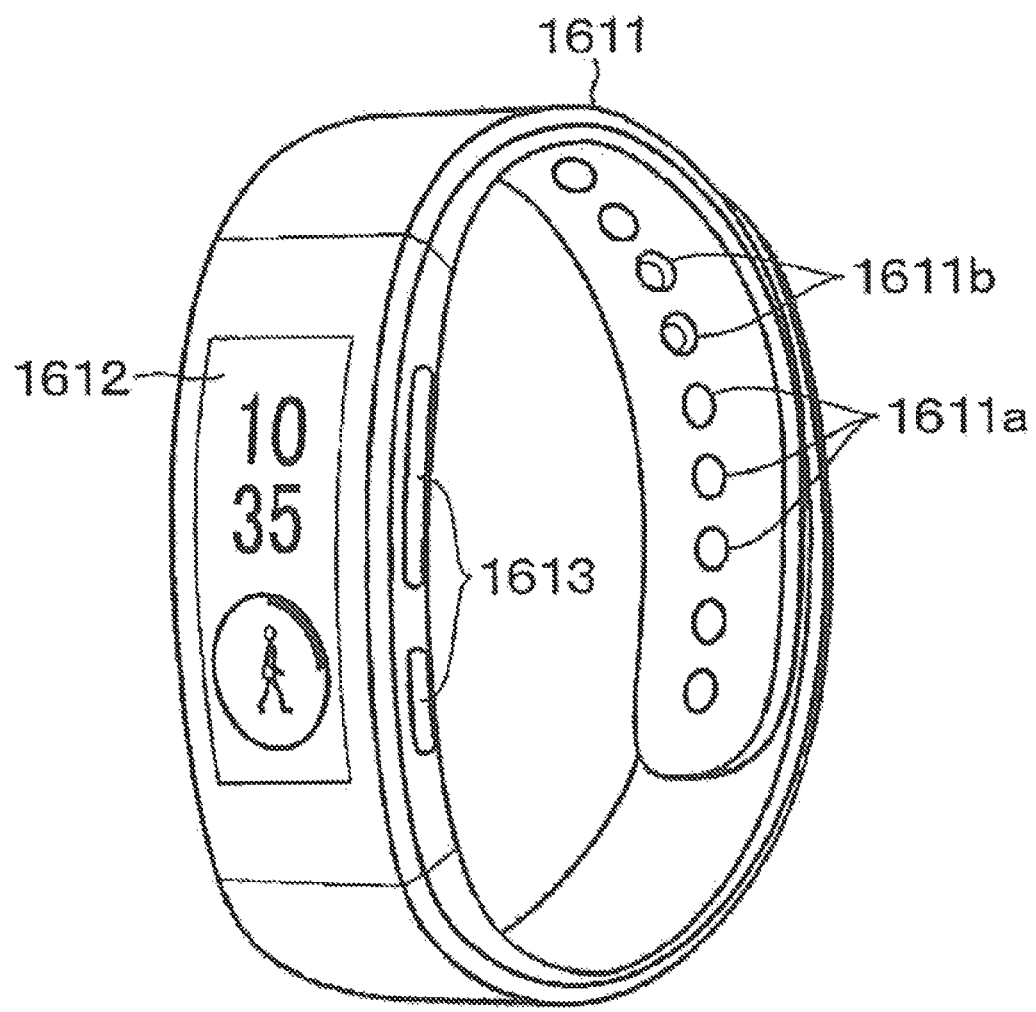
FIG. 15 is a diagram illustrating a configuration of Application Example of a non-aqueous electrolyte secondary battery according to an embodiment of the present technology.

FIG. 15 illustrates an external configuration example of a wristband type electronic device 1601 (hereinafter, simply referred to as an "electronic device 1601").

The electronic device 1601 is, for example, a watch-type so-called wearable device that is attachable to and detachable from the human body. The electronic device 1601 includes, for example, a band unit 1611 attached to the arm, a display device 1612 that displays numbers, characters, and symbols, and an operation button 1613. The band unit 1611 is formed with a plurality of holes 1611a, and protrusions 1611b formed on an inner peripheral surface (a surface that comes into contact with the arm when the electronic device 1601 is attached).

In a use state, the electronic device 1601 is attached to the arm by bending that band unit 1611 so as to have a substantially circular shape as illustrated in FIG. 15 and inserting the protrusions 1611b into the holes 1611a. It is possible to adjust a diameter corresponding to the thickness of the arm by adjusting the positions of the holes 1611a into which the protrusions 1611b are inserted. In an unused state, the protrusions 1611b are detached from the holes 1611a, and the electronic device 1601 is stored in a state in which the band unit 1611 is a substantially flat. For example, a sensor according to an embodiment of the present technology is provided over the entire band unit 1611.

Smartwatches have the same or similar appearance as existing wristwatch designs, and are worn on the wrist of the user in the same manner as the wristwatch, and have a function of notifying the user of various message such as reception of incoming calls and e-mails by using information displayed on a display. Smartwatches having functions such as an electronic money function and an activity meter have been proposed. In the smartwatch, the display is incorporated on the surface of the main body unit of the electronic device, and various information is displayed on the display. The smartwatch can also cooperate with functions and contents of a communication terminal (smartphone) by performing short-range wireless communication such as Bluetooth (registered trademark) with the communication terminal.

As one of the smartwatches, a smartwatch that includes a plurality of segments connected in a band shape, a plurality of electronic components arranged in the plurality of segments, and a flexible circuit board that connects the plurality of electronic components within the plurality of segments and is disposed in a meander shape within at least one segment has been proposed. The flexible circuit board has such a meander shape, and thus, the flexible circuit board is not stressed even when the band is bent. Accordingly, a circuit is prevented from being cut. It is possible to incorporate electronic circuit components in the band-side segment attached to a watch main body instead of a housing constituting the watch main body. Since it is not necessary to change the watch main body, it is possible to obtain a smartwatch having the same design as a design of a watch of the related art. The smartwatch of the present application example can perform notifications such as e-mails and incoming calls, recording of logs of a user behavior history, and telephone calls. The smartwatch has a function as a non-contact type IC card, and can perform payment and authentication in a non-contact manner.

The smartwatch of the present application example incorporates the circuit components for performing communication processing and notification processing in a metal band. In order to function as the electronic device while the thickness of the metal band is reduced, the band is constructed by connecting the plurality of segments, and a circuit board, a vibration motor, a battery, and an acceleration sensor are accommodated in each segment. Components such as the circuit board, the vibration motor, the battery, and the acceleration sensor in each segment are connected by a flexible printed circuit board (FPC).

Figure 16:
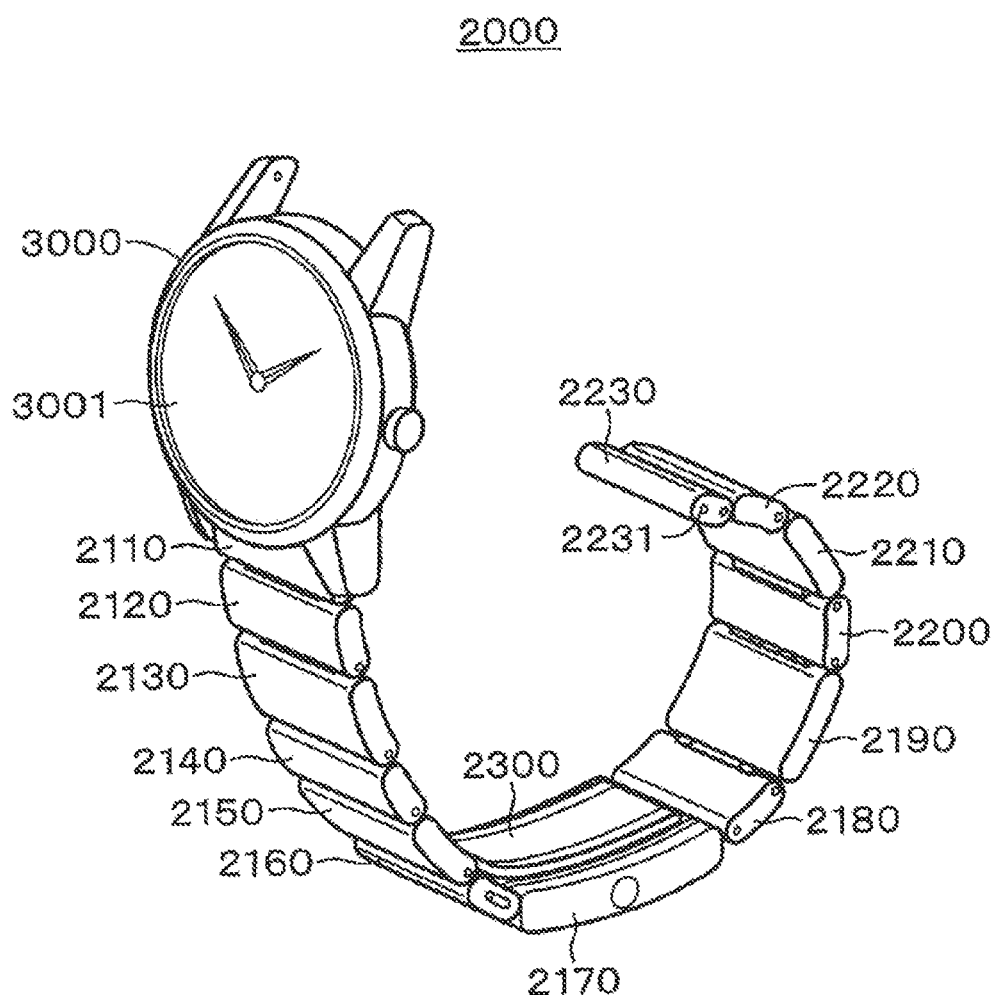
FIG. 16 is an exploded perspective view illustrating a configuration of Application Example of the non-aqueous electrolyte secondary battery according to an embodiment of the present technology.

FIG. 16 illustrates the entire configuration (exploded perspective view) of the smartwatch. A band type electronic device 2000 is a metal band attached to a watch main body 3000, and is attached to the arm of the user. The watch main body 3000 includes a dial plate 3100 that displays a time. The watch main body 3000 may electronically display the time on a liquid crystal display instead of the dial plate 3100.

The band type electronic device 2000 has a configuration in which a plurality of segments 2110 to 2230 is connected. The segment 2110 is attached to one band attachment hole of the watch main body 3000, and the segment 2230 is attached to the other band attachment hole of the watch main body 3000. In the present example, each of the segments 2110 to 2230 is made of metal.

Figure 17:
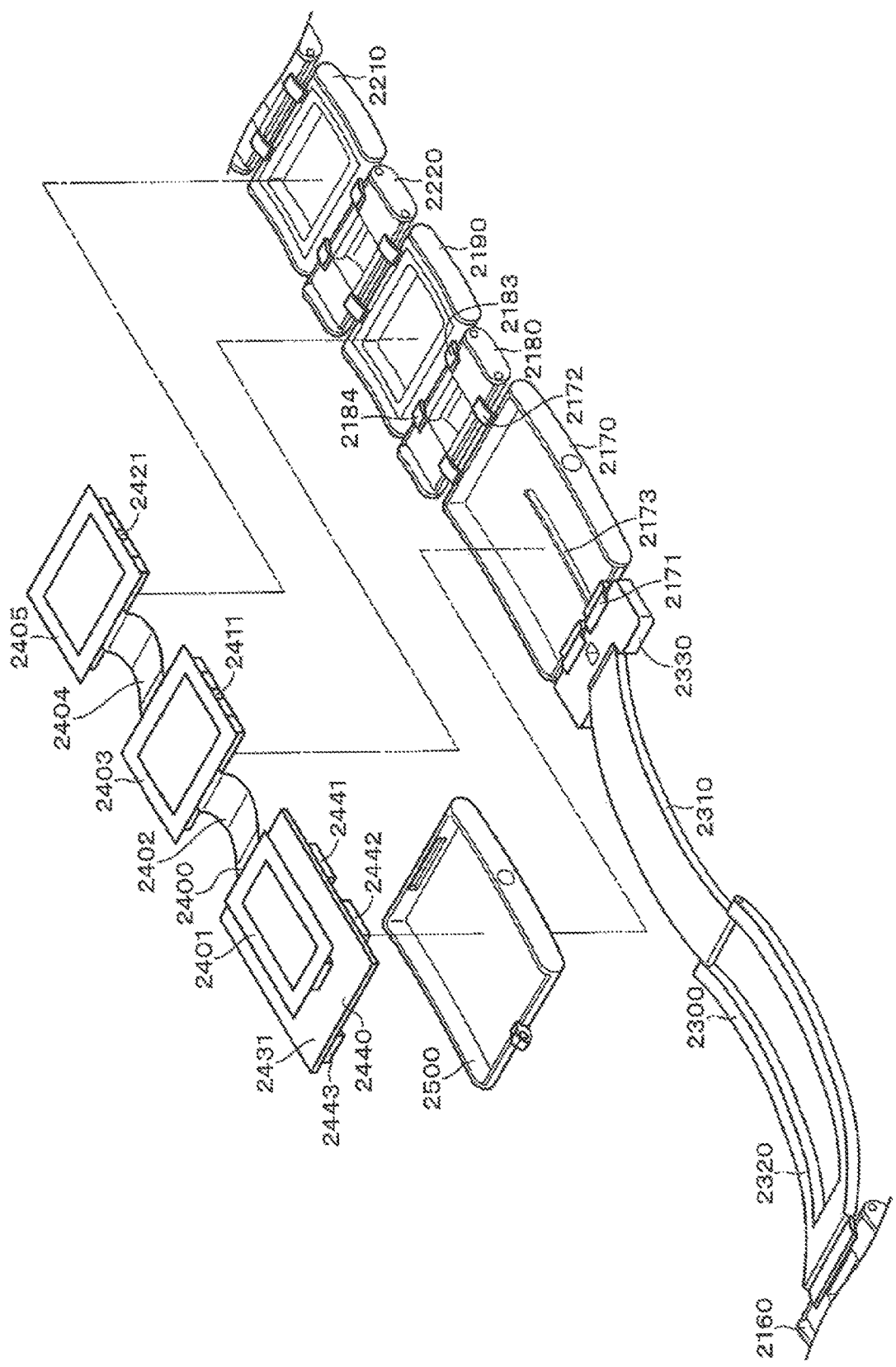
FIG. 17 is a diagram illustrating a part of an internal configuration of Application Example of the non-aqueous electrolyte secondary battery according to an embodiment of the present technology.

FIG. 17 illustrates a part of an internal configuration of the band type electronic device 2000. For example, the inside of three segments 2170, 2180, 2190, 2200, 2210 is illustrated. In the band type electronic device 2000, a flexible circuit board 2400 is arranged inside five continuous segments 2170 to 2210. Various electronic components are arranged in the segment 2170, and batteries 2411 and 2421 according to the present technology are arranged in the segments 2190 and 2210, and these components are electrically connected by the flexible circuit board 2400. The segment 2180 between the segment 2170 and the segment 2190 has a relatively small size, and the flexible circuit board 2400 in a meander state is disposed.

The flexible circuit board 2400 is disposed inside the segment 2180 in a state of being sandwiched between waterproofing members. The inside of the segments 2170 to 2210 has a waterproof structure.

Figure 18:
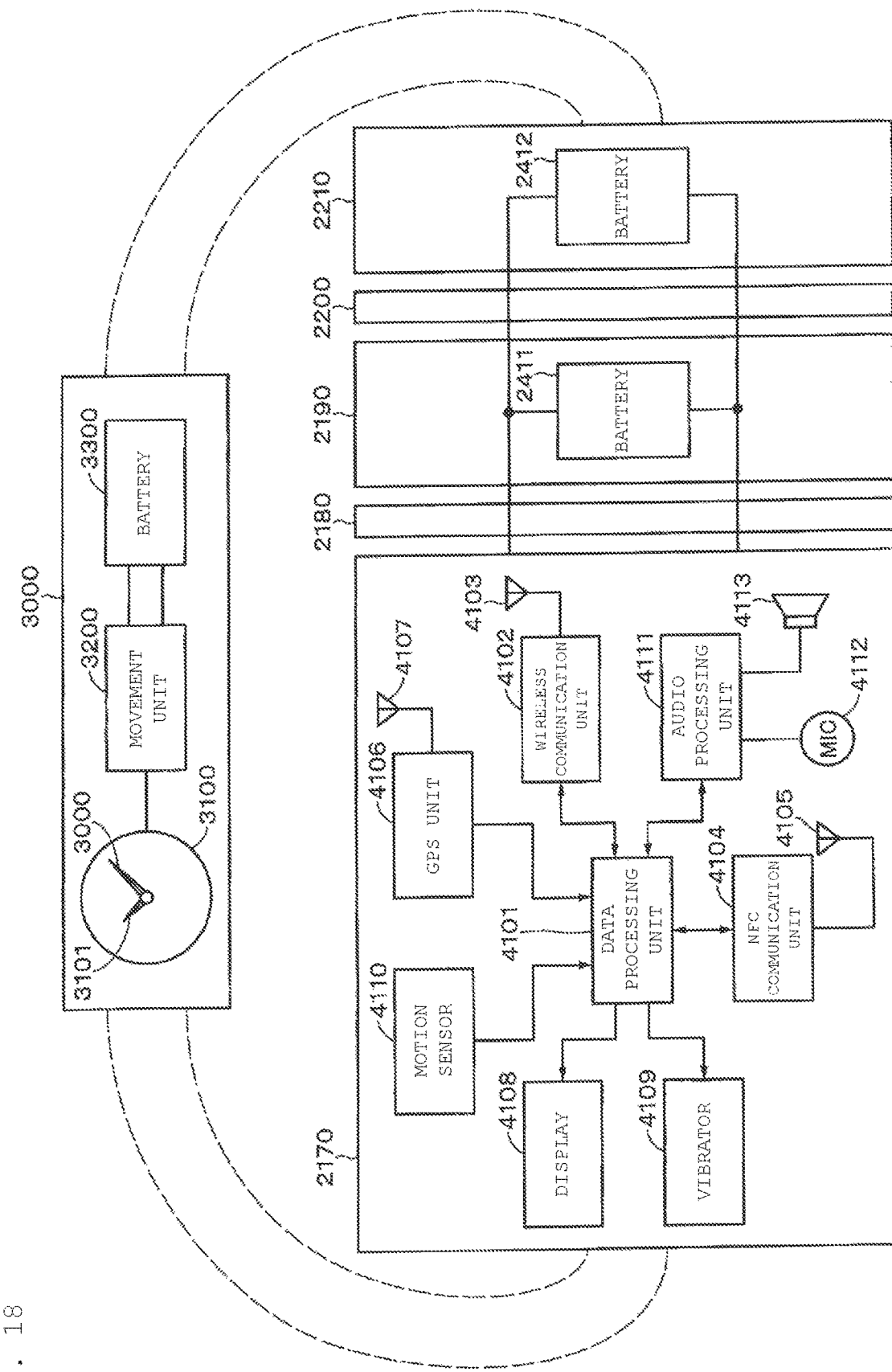
FIG. 18 is a block diagram illustrating a circuit configuration of Application Example of the non-aqueous electrolyte secondary battery according to an embodiment of the present technology.

FIG. 18 is a block diagram illustrating a circuit configuration of the band type electronic device 2000. The circuit inside the band type electronic device 2000 has a configuration independent of the watch main body 3000. The watch main body 3000 includes a movement unit 3200 that rotates needles arranged on the dial plate 3100. A battery 3300 is connected to the movement unit 3200. The movement unit 3200 and the battery 3300 are built in the housing of the watch main body 3000.

In the band type electronic device 2000 connected to the watch main body 3000, electronic components are arranged in three segments 2170, 2190, and 2210. A data processing unit 4101, a wireless communication unit 4102, an NFC communication unit 4104, and a GPS unit 4106 are arranged in the segment 2170. Antennas 4103, 4105, and 4107 are connected to the wireless communication unit 4102, the NFC communication unit 4104, and the GPS unit 4106, respectively. Each of the antennas 4103, 4105, and 4107 is disposed in the vicinity of a slit 2173 of the segment 2170 to be described below.

The wireless communication unit 4102 performs short-range wireless communication with other terminals according to, for example, Bluetooth (registered trademark) standard. The NFC communication unit 4104 performs wireless communication with an adjacent reader/writer according to the NFC standard. The GPS unit 4106 is a positioning unit that receives radio waves from a satellite of a system called Global Positioning System (GPS) and measures a current position. Data obtained by the wireless communication unit 4102, the NFC communication unit 4104, and the GPS unit 4106 is supplied to the data processing unit 4101.

A display 4108, a vibrator 4109, a motion sensor 4110, and an audio processing unit 4111 are arranged in the segment 2170. The display 4108 and the vibrator 4109 function as a notification unit that notifies a wearer of the band type electronic device 2000. The display 4108 includes a plurality of light emitting diodes, and notifies the user by turning on and off the light emitting diodes. For example, the plurality of light emitting diodes is arranged in a slit 2173 of the segment 2170 to be described below, and incoming calls and reception of e-mails are notified by turning on and off the light emitting diodes. A display that displays characters and numbers may be used as the display 4108. The vibrator 4109 is a member that vibrates the segment 2170. The band type electronic device 2000 notifies an incoming call and an e-mail by the vibration of the segment 2170 by the vibrator 4109.

The motion sensor 4110 detects the movement of the user wearing the band type electronic device 2000. An acceleration sensor, a gyro sensor, an electronic compass, or an atmospheric pressure sensor is used as the motion sensor 4110. The segment 2170 may incorporate a sensor other than the motion sensor 4110. For example, a biosensor that detects the pulse of the user wearing the band type electronic device 2000 may be incorporated. A microphone 4112 and a speaker 4113 are connected to the audio processing unit 4111, and the audio processing unit 4111 performs a call process with the other party connected through wireless communication in the wireless communication unit 4102. The audio processing unit 4111 can also perform processing for voice input operation.

The segment 2190 incorporates the battery 2411, and the segment 2210 incorporates the battery 2421. The batteries 2411 and 2421 can be the non-aqueous electrolyte secondary batteries according to the present technology, and power for driving is supplied to the circuit in the segment 2170. The circuit in the segment 2170 and the batteries 2411 and 2421 are connected by the flexible circuit board 2400 (FIG. 17). Although not illustrated in FIG. 16, the segment 2170 includes terminals for charging the batteries 2411 and 2421. Electronic components other than the batteries 2411 and 2421 may be arranged in the segments 2190 and 2210. For example, the segments 2190 and 2210 may include circuits that controls the charging and discharging of the batteries 2411 and 2421.

A glasses-type terminal to be described below can display information such as text, symbols, and images superimposed on a scenery in front of the user. That is, a display module of a light-weight and thin image display device dedicated to a transmissive glasses type terminal is mounted. A typical example is a head-mounted display (HMD).

This image display device includes an optical engine and a hologram light guide plate. The optical engine emits image light such as an image and text by using a micro display lens. This image light is incident on the hologram light guide plate. The hologram light guide plate has hologram optical elements built into both ends of a transparent plate. The image light from the optical engine propagates through a very thin transparent plate having a thickness of 1 mm, and reaches the eyes of an observer. With such a configuration, a lens (including protective plates in front of and behind the light guide plate) having a transmittance of, for example, 85% and a thickness of 3 mm is realized. With such a glasses type terminal, it is possible to see the results of players and teams in real time at the time of watching sports, and it is possible to display a tourist guide at a travel destination.

Figure 19:
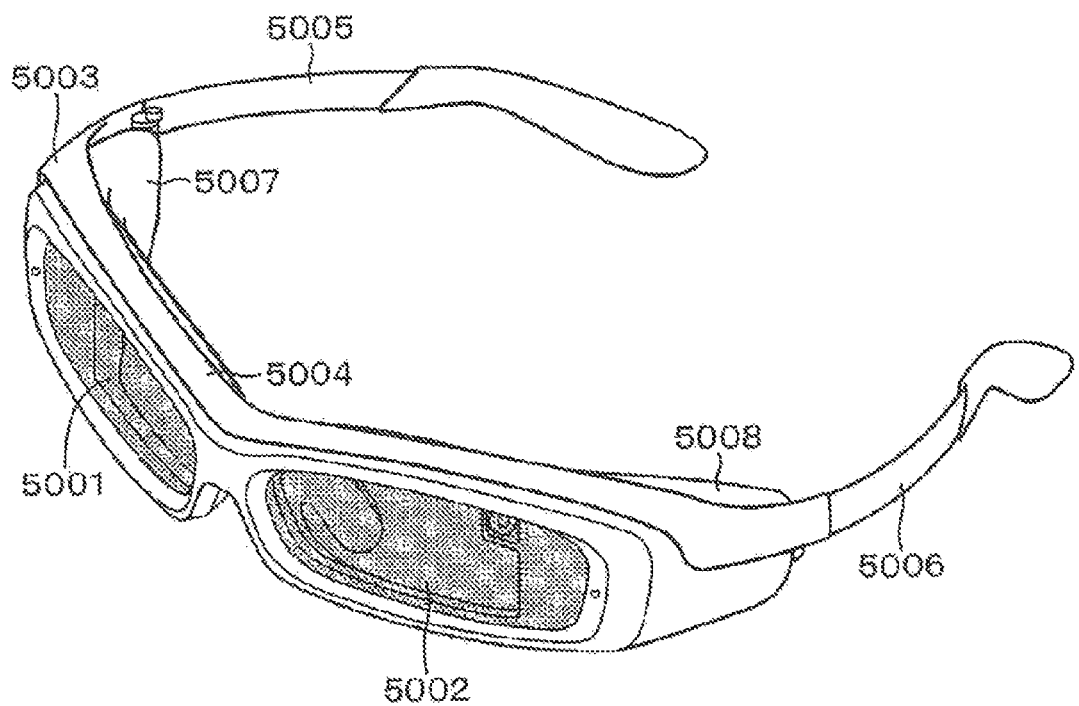
FIG. 19 is a diagram illustrating a specific example of a configuration of Application Example of the non-aqueous electrolyte secondary battery according to an embodiment of the present technology.

As a specific example of the glasses type terminal, the image display unit has a glasses type configuration as illustrated in FIG. 19. That is, similar to normal glasses, a frame 5003 for holding a right image display portion 5001 and a left image display portion 5002 is provided in front of the eyes. The frame 5003 includes a front portion 5004 disposed in front of the observer, and two temple portions 5005 and 5006 that are rotatably attached to both ends of the front portion 5004 through hinges. The frame 5003 is made of the same material as that of normal glasses such as metal, alloy, plastic, or a combination thereof. A headphone unit may be provided.

The right image display portion 5001 and the left image display portion 5002 are arranged so as to be positioned in front of the right eye and the left eye of the user, respectively. The temple portions 5005 and 5006 hold the right image display portion 5001 and the left image display portion 5002 on the head of the user. A right display drive portion 5007 is disposed inside the temple portion 5005 at a connection portion between the front portion 5004 and the temple portion 5005. A left display driving portion 5008 is disposed inside the temple portion 5006 at a connection portion between the front portion 5004 and the temple portion 5006.

Although omitted in FIG. 19, the non-aqueous electrolyte secondary battery, the acceleration sensor, the gyroscope, the electronic compass, and the microphone/speaker according to the present technology are mounted on the frame 5003. An imaging device is attached, and still images and moving images can be captured. A controller connected to a glasses unit through, for example, a wireless or wired interface is provided. A touch sensor, various buttons, a speaker, and a microphone are provided in the controller. The glasses type terminal has a function of cooperating with a smartphone. For example, it is possible to provide information corresponding to the situation of the user by utilizing the GPS function of the smartphone.

The present technology is not limited to the above-described embodiments, examples, and application examples, and can be modified without departing from the gist of the present technology.

Since the effects of the present technology should be obtained without depending on the kind of an electrode reactant as long as the electrode reactant is an electrode reactant used in the non-aqueous electrolyte secondary battery, it is possible to obtain the same effects even though the kind of the electrode reactant is changed. Chemical formulas of compounds are representative, and are not limited to the described valences as long as the same compounds have general names.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A non-aqueous electrolyte secondary battery comprising:
   a negative electrode including a negative electrode mixture;
   a positive electrode; and
   an electrolytic solution including an electrolyte and a solvent,
   wherein the negative electrode mixture includes a negative electrode active material powder,
   the negative electrode active material powder includes a carbon-based material and a silicon-based material,
   a mixing ratio of the carbon-based material to the silicon-based material (carbon-based material (mass %)/silicon-based material (mass %)) is from 90 mass %/10 mass % to 0 mass %/100 mass %,
   a negative electrode potential at a point of a battery voltage of 0 V is 3.2 Vvs(Li/Li) or less in a deep discharging at a current rate of 0.001 ItA reaching the battery voltage of 0 V, and
   an electrolyte concentration in the negative electrode mixture is higher than an electrolyte concentration in the electrolytic solution, wherein a ratio of the electrolyte concentration in the negative electrode mixture to the electrolyte concentration in the electrolytic solution is more than 1 and 2.5 or less,
   wherein the silicon-based material includes at least one compound selected from a group consisting of metallic silicon, silicon oxide, silicon fluoride, silicon alloy, lithium fluosilicate, and combinations thereof, and
   wherein the carbon-based material includes any one of graphitizable carbon, non-graphitizable carbon and graphite.

2. The non-aqueous electrolyte secondary battery according to claim 1,
   wherein the negative electrode potential at the point of the battery voltage of 0 V is 3.15 Vvs(Li/Li$^+$) or less in the deep discharging at the current rate of 0.001 ItA reaching the battery voltage of 0 V.

3. The non-aqueous electrolyte secondary battery according to claim 1, wherein the negative electrode active material powder includes at least one of fibrous carbon and high-conductivity powdery carbon.

4. The non-aqueous electrolyte secondary battery according to claim 1, wherein the electrolyte includes at least lithium hexafluorophosphate.

5. The non-aqueous electrolyte secondary battery according to claim 1, wherein the electrolyte includes at least a lithium electrolyte salt including boron.

6. The non-aqueous electrolyte secondary battery according to claim 1, wherein the negative electrode mixture includes at least polyvinylidene fluoride.

7. A battery pack comprising:
   the non-aqueous electrolyte secondary battery according to claim 1;
   a controller configured to control a use state of the non-aqueous electrolyte secondary battery; and
   a switch configured to switch the use state of the non-aqueous electrolyte secondary battery according to an instruction of the controller.

8. A vehicle comprising:
   the non-aqueous electrolyte secondary battery according to claim 1;
   a driving force converter configured to receive power supplied from the non-aqueous electrolyte secondary battery, and convert the received power into a driving force of the vehicle;
   a driver configured to drive according to the driving force; and
   a vehicle control device.

9. A power storage system comprising:
   a power storage device including the non-aqueous electrolyte secondary battery according to claim 1;
   a power consumption apparatus to which power is configured to be supplied from the non-aqueous electrolyte secondary battery;
   a controller configured to control the supply of the power to the power consumption apparatus from the non-aqueous electrolyte secondary battery; and
   a power generator configured to charge the non-aqueous electrolyte secondary battery.

10. An electric tool comprising:
    the non-aqueous electrolyte secondary battery according to claim 1; and
    a movable unit to which power from the non-aqueous electrolyte secondary battery is configured to be supplied.

11. An electronic device comprising the non-aqueous electrolyte secondary battery according to claim 1,
    wherein the electronic device is configured to receive power supplied from the non-aqueous electrolyte secondary battery.

12. The non-aqueous electrolyte secondary battery according to claim 1, wherein a ratio of the electrolyte concentration in the negative electrode mixture to the electrolyte concentration in the electrolytic solution is more than 1.2 and 2.0 or less.

* * * * *